(12) United States Patent
Chen

(10) Patent No.: US 11,848,823 B2
(45) Date of Patent: Dec. 19, 2023

(54) SYSTEM AND METHOD TO RECOVER FROM LINK OR NODE FAILURE IN A NETWORK

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 17/192,019

(22) Filed: Mar. 4, 2021

(65) Prior Publication Data

US 2021/0203562 A1   Jul. 1, 2021

Related U.S. Application Data

(63) Continuation of application No. PCT/US2019/063987, filed on Dec. 2, 2019.
(Continued)

(51) Int. Cl.
*H04L 41/12* (2022.01)
*H04L 41/0677* (2022.01)
(Continued)

(52) U.S. Cl.
CPC .......... *H04L 41/12* (2013.01); *H04L 41/0677* (2013.01); *H04L 45/28* (2013.01); *H04L 45/32* (2013.01)

(58) Field of Classification Search
CPC ..... H04L 41/0677; H04L 41/12; H04L 45/02; H04L 45/03; H04L 45/22; H04L 45/28; H04L 45/32
See application file for complete search history.

(56) References Cited

U.S. PATENT DOCUMENTS

| 7,330,440 B1* | 2/2008 | Bryant | H04L 45/28 370/254 |
| 2010/0271936 A1* | 10/2010 | Allan | H04L 45/22 370/254 |

(Continued)

FOREIGN PATENT DOCUMENTS

CN   101651608 A   2/2010

OTHER PUBLICATIONS

International Search Report & The Written Opinion of the International Searching Authority dated Feb. 12, 2020 International Application No. PCT/US2019/063987.
(Continued)

*Primary Examiner* — Pao Sinkantarakorn
(74) *Attorney, Agent, or Firm* — Vierra Magen Marcus LLP

(57) ABSTRACT

The disclosure relates to recovering from a failure in a network. A flooding topology, represented by links between nodes in the network, is computed. Alternative connections for the links and the nodes on the flooding topology are also computed. A change in the flooding topology is detected, where the change indicates the failure in the network and results in a split of the flooding topology. A link state message is flooded to each of the nodes in a remaining part of the flooding topology and to the alternative connections, such that the link state message identifies the failure in the network. The failure in the network is resolved by connecting the split flooding topology using the remaining part of the flooding topology and the alternative connections as identified in the link state message.

26 Claims, 22 Drawing Sheets

Related U.S. Application Data

(60) Provisional application No. 62/773,571, filed on Nov. 30, 2018.

(51) Int. Cl.
  *H04L 45/28* (2022.01)
  *H04L 45/00* (2022.01)

(56) References Cited

U.S. PATENT DOCUMENTS

| | | | |
|---|---|---|---|
| 2013/0064070 A1* | 3/2013 | Kolavennu | H04L 41/0836 370/254 |
| 2018/0115481 A1 | 4/2018 | White et al. | |
| 2019/0312805 A1* | 10/2019 | Li | H04L 45/32 |

OTHER PUBLICATIONS

Chen, Huaimo, et al., "LS Flooding Reduction; draft-cc-ospf-flooding-reduction-04", Network Working Group, Internet-Draft, Internet Engineering Task Force, (IETF), Internet Society (ISOC), Geneva, Switzerland, No. 4, Sep. 20, 2018, pp. 1-42.
International Preliminary Report on Patentability dated Jun. 10, 2021, International Application No. PCT/US2019/063987.
Chinese Office Action dated Dec. 6, 2021, Chinese Application No. 201980067036.2.

* cited by examiner

```
 0 1 2 3 4 5 6 7 8
+-+-+-+-+-+-+-+-+
|K|                   1 bit (K=1: Key/Critical Node, K=0: Normal Node)
+-+-+-+
|NNBP |               3 bits (number of node backup paths)       |
+-+-+-+-+-+                                                      |
|PLEN |               4 bits (backup path len)   |                |
+-+-+-+-+-+                                      |                |
|ENSI |               3 bits(Ix Bits Indication)|                | Backup
+-+-+-+-+-+-+-+-+                                | One           } paths
|   PN1 Index  |      Bits indicated by ENSI    } backup path   | for Node
+-+-+-+-+-+-+-+-+                                | for Node      |
~              ~                                                 |
+-+-+-+-+-+-+-+-+                                                |
|   PNn Index  |      Bits indicated by ENSI   _|                |
+-+-+-+-+-+-+-+-+                                                |
//              //                                              _|
```

*FIG. 6*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      NBP-TLV-Type (TBD1)      |          TLV-Length           |
+-+-+-+-+-+-+-+-+-+-+-+-+-+-+-+-+-+-+-+-+-+-+-+-+-+-+-+-+-+-+-+-+
|Node1 Index Enc|   Variable bits
+-+-+-+-+-+-+-+-+-+-+-+-+-+-+-+-+-+-+-+-+-+-+-+-+-+-+-+-+-+-+-+-+
:                   Node1 backup paths encoding                 :
+-+-+-+-+-+-+-+-+-+-+-+-+-+-+-+-+-+-+-+-+-+-+-+-+-+-+-+-+-+-+-+-+
|Node2 Index Enc|   Variable bits
+-+-+-+-+-+-+-+-+-+-+-+-+-+-+-+-+-+-+-+-+-+-+-+-+-+-+-+-+-+-+-+-+
:                   Node2 backup paths encoding                 :
+-+-+-+-+-+-+-+-+-+-+-+-+-+-+-+-+-+-+-+-+-+-+-+-+-+-+-+-+-+-+-+-+
//                                                             //
```

*FIG. 7*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      LBP-TLV-Type (TBD2)      |           TLV-Length          |
+-+-+-+-+-+-+-+-+-+-+-+-+-+-+-+-+-+-+-+-+-+-+-+-+-+-+-+-+-+-+-+-+
|Link1 Index Enc|  Variable bits                                
+-+-+-+-+-+-+-+-+-+-+-+-+-+-+-+-+-+-+-+-+-+-+-+-+-+-+-+-+-+-+-+-+
:                    Link1 backup paths encoding               :
+-+-+-+-+-+-+-+-+-+-+-+-+-+-+-+-+-+-+-+-+-+-+-+-+-+-+-+-+-+-+-+-+
|Link2 Index Enc|  Variable bits                                
+-+-+-+-+-+-+-+-+-+-+-+-+-+-+-+-+-+-+-+-+-+-+-+-+-+-+-+-+-+-+-+-+
:                    Link2 backup paths encoding               :
+-+-+-+-+-+-+-+-+-+-+-+-+-+-+-+-+-+-+-+-+-+-+-+-+-+-+-+-+-+-+-+-+
//                                                             //
```

*FIG. 10*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            LS age             |   Options     |  LS Type = 10 |
+-+-+-+-+-+-+-+-+-+-+-+-+-+-+-+-+-+-+-+-+-+-+-+-+-+-+-+-+-+-+-+-+
| BP Type(TBD3) |                 Instance ID                   |
+-+-+-+-+-+-+-+-+-+-+-+-+-+-+-+-+-+-+-+-+-+-+-+-+-+-+-+-+-+-+-+-+
|                       Advertising Router                      |
+-+-+-+-+-+-+-+-+-+-+-+-+-+-+-+-+-+-+-+-+-+-+-+-+-+-+-+-+-+-+-+-+
|                       LS Sequence Number                      |
+-+-+-+-+-+-+-+-+-+-+-+-+-+-+-+-+-+-+-+-+-+-+-+-+-+-+-+-+-+-+-+-+
|         LS checksum           |            Length             |
+-+-+-+-+-+-+-+-+-+-+-+-+-+-+-+-+-+-+-+-+-+-+-+-+-+-+-+-+-+-+-+-+
|                                                               |
~               Link and Node Backup Paths TLVs                 ~
+-+-+-+-+-+-+-+-+-+-+-+-+-+-+-+-+-+-+-+-+-+-+-+-+-+-+-+-+-+-+-+-+
```

*FIG. 11*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      FTLK-TLV-Type (TBD5)     |          TLV-Length           |
+-+-+-+-+-+-+-+-+-+-+-+-+-+-+-+-+-+-+-+-+-+-+-+-+-+-+-+-+-+-+-+-+
~           Links Encoding (Node 1 to its Remote Nodes)         ~
+-+-+-+-+-+-+-+-+-+-+-+-+-+-+-+-+-+-+-+-+-+-+-+-+-+-+-+-+-+-+-+-+
~           Links Encoding (Node 2 to its Remote Nodes)         ~
+-+-+-+-+-+-+-+-+-+-+-+-+-+-+-+-+-+-+-+-+-+-+-+-+-+-+-+-+-+-+-+-+
~                                                               ~
~                                                               ~
+-+-+-+-+-+-+-+-+-+-+-+-+-+-+-+-+-+-+-+-+-+-+-+-+-+-+-+-+-+-+-+-+
~           Links Encoding (Node N to its Remote Nodes)         ~
+-+-+-+-+-+-+-+                                     +-+-+-+-+-+-+
```

*FIG. 14*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           LS age              |    Options    |  LS Type = 10 |
+-+-+-+-+-+-+-+-+-+-+-+-+-+-+-+-+-+-+-+-+-+-+-+-+-+-+-+-+-+-+-+-+
| FT Type(TBD6) |               Instance ID                     |
+-+-+-+-+-+-+-+-+-+-+-+-+-+-+-+-+-+-+-+-+-+-+-+-+-+-+-+-+-+-+-+-+
|                     Advertising Router                        |
+-+-+-+-+-+-+-+-+-+-+-+-+-+-+-+-+-+-+-+-+-+-+-+-+-+-+-+-+-+-+-+-+
|                     LS Sequence Number                        |
+-+-+-+-+-+-+-+-+-+-+-+-+-+-+-+-+-+-+-+-+-+-+-+-+-+-+-+-+-+-+-+-+
|         LS checksum           |            Length             |
+-+-+-+-+-+-+-+-+-+-+-+-+-+-+-+-+-+-+-+-+-+-+-+-+-+-+-+-+-+-+-+-+
|                                                               |
~                  Flooding Topology Links TLV                  ~
+-+-+-+-+-+-+-+-+-+-+-+-+-+-+-+-+-+-+-+-+-+-+-+-+-+-+-+-+-+-+-+-+
```

*FIG. 15*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             LS age            |1|0|1|       FT-LSA (TBD7)     |
+-+-+-+-+-+-+-+-+-+-+-+-+-+-+-+-+-+-+-+-+-+-+-+-+-+-+-+-+-+-+-+-+
|                         Link State ID                          |
+-+-+-+-+-+-+-+-+-+-+-+-+-+-+-+-+-+-+-+-+-+-+-+-+-+-+-+-+-+-+-+-+
|                       Advertising Router                       |
+-+-+-+-+-+-+-+-+-+-+-+-+-+-+-+-+-+-+-+-+-+-+-+-+-+-+-+-+-+-+-+-+
|                       LS Sequence Number                       |
+-+-+-+-+-+-+-+-+-+-+-+-+-+-+-+-+-+-+-+-+-+-+-+-+-+-+-+-+-+-+-+-+
|         LS checksum          |            Length               |
+-+-+-+-+-+-+-+-+-+-+-+-+-+-+-+-+-+-+-+-+-+-+-+-+-+-+-+-+-+-+-+-+
|                                                                |
~                    Flooding Topology Links TLV                 ~
+-+-+-+-+-+-+-+-+-+-+-+-+-+-+-+-+-+-+-+-+-+-+-+-+-+-+-+-+-+-+-+-+
```

*FIG. 16*

```
 0 1 2 3 4 5 6 7 8
+-+-+-+-+-+-+-+-+-+
|ENSI |             3 bits(#bits indication)  |
+-+-+-+-+-+-+-+-+-+                           } Local Node LN1
| LN1 Index Value | #bits indicated by ENSI _ | Encoding
+-+-+-+-+-+-+-+-+-+-+-+-+-+-+-+-+-+-+-+-+-+-+-+-+-+-+-+-+-+-+-+-+
:              Local node LN1 backup paths encoding             :
+-+-+-+-+-+-+-+-+-+-+-+-+-+-+-+-+-+-+-+-+-+-+-+-+-+-+-+-+-+-+-+-+
```

*FIG. 17*

```
 0 1 2 3 4 5 6 7 8
+-+-+-+-+-+-+-+-+-+
|RN10 Index Value |   (#bits indicated by ENSI)
+-+-+-+-+-+-+-+-+-+-+-+-+-+-+-+-+-+-+-+-+-+-+-+-+-+-+-+-+-+-+-+-+
:            Remote node RN10 backup paths encoding             :
+-+-+-+-+-+-+-+-+-+-+-+-+-+-+-+-+-+-+-+-+-+-+-+-+-+-+-+-+-+-+-+-+
```

*FIG. 18*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
:             Local Node with backup paths encoding             :
+-+-+-+-+-+-+-+-+-+-+-+-+-+-+-+-+-+-+-+-+-+-+-+-+-+-+-+-+-+-+-+-+
| NN  |   Number of Remote Nodes (Number of links)
+-+-+-+
| ENSI|   Remote Node Index Size Indication
+-+-+-+-+-+-+-+-+-+-+-+-+-+-+-+-+-+-+-+-+-+-+-+-+-+-+-+-+-+-+-+-+
:            Remote Node 1 with backup paths encoding           :
+-+-+-+-+-+-+-+-+-+-+-+-+-+-+-+-+-+-+-+-+-+-+-+-+-+-+-+-+-+-+-+-+
:                  Link1 backup paths Encoding                  :
+-+-+-+-+-+-+-+-+-+-+-+-+-+-+-+-+-+-+-+-+-+-+-+-+-+-+-+-+-+-+-+-+
:            Remote Node 2 with backup paths encoding           :
+-+-+-+-+-+-+-+-+-+-+-+-+-+-+-+-+-+-+-+-+-+-+-+-+-+-+-+-+-+-+-+-+
:                  Link2 backup paths Encoding                  :
+-+-+-+-+-+-+-+-+-+-+-+-+-+-+-+-+-+-+-+-+-+-+-+-+-+-+-+-+-+-+-+-+
|                                                               |
```

*FIG. 19*

```
+-+-+-+-+-+-+-+-+-+
|0 0 0|                      ENSI (3 bits)
+-+-+-+-+-+-+-+-+-+
| LN1 Index Value |          CNI (9 bits) for LN1        | Node LN1
+-+-+-+-+-+-+-+-+-+                                      } with
|K|                          1 bit(Critical Node Flag)   | backup paths
+-+-+-+-+-+-+-+-+-+-+-+                                  | encoding
~ Backup paths for LN1   ~                               |
+-+-+-+-+-+-+-+-+-+-+-+-+                               _|
|0 1 1|                      NN (3 bits)
+-+-+-+
|0 0 0|                      ENSI (3 bits)
+-+-+-+-+-+-+-+-+-+
| RN10's Index   |           CNI (9 bits) for RN10
+-+-+-+-+-+-+-+-+-+                                      | Node RN10
|K|                          1 bit(Critical Node Flag)   } with
+-+-+-+-+-+-+-+-+-+-+-+                                  | backup paths
~ Backup paths for RN10 ~                               _| encoding
+-+-+-+-+-+-+-+-+-+-+-+-+
| RN20's Index   |           CNI (9 bits) for RN20
+-+-+-+-+-+-+-+-+-+                                      | Node RN20
|K|                          1 bit(Critical Node Flag)   } with
+-+-+-+-+-+-+-+-+-+-+-+                                  | backup paths
~ Backup paths for RN20 ~                               _| encoding
+-+-+-+-+-+-+-+-+-+-+-+-+
| RN30's Index   |           CNI (9 bits) for RN30
+-+-+-+-+-+-+-+-+-+                                      | Node RN20
|K|                          1 bit(Critical Node Flag)   } with
+-+-+-+-+-+-+-+-+-+-+-+                                  | backup paths
~ Backup paths for RN30 ~                               _| encoding
+-+-+-+-+-+-+-+-+-+-+-+-+
```

*FIG. 20*

```
+-+-+-+-+-+-+-+-+-+
|0 0 0|                      ENSI (3 bits)          ¯|
+-+-+-+-+-+-+-+-+-+                                  |
| LN1 Index Value |          CNI (9 bits) for LN1    | Node LN1
+-+-+-+-+-+-+-+-+-+                                  } with
|K|                          1 bit(Critical Node Flag) | backup paths
+-+-+-+-+-+-+-+-+-+-+-+                              | encoding
~ Backup paths for LN1  ~                            |
+-+-+-+-+-+-+-+-+-+-+-+-+                           _|
|0 1 1|                      NN (3 bits)
+-+-+-+
|0 0 0|                      ENSI (3 bits)           ¯|
+-+-+-+-+-+-+-+-+-+                                  |
| RN10's Index    |          CNI (9 bits) for RN10   | Node RN10
+-+-+-+-+-+-+-+-+-+                                  | with
|K|                          1 bit(Critical Node Flag) } backup paths
+-+-+-+-+-+-+-+-+-+-+-+                              | encoding
~ Backup paths for RN10 ~                           _|
+-+-+-+-+-+-+-+-+-+-+-+-+
|C|                 1 bit (Critical Link Flag)       |Link LN1-RN10
+-+-+                                             _  |with backup
|NLB|               2 bits(# of link backup paths)  | |path
+-+-+-+                                             | |encoding
|PLEN |             3 bits(backup path len) |       | |
+-+-+-+                                             | |         |
|ENSI |             3 bits(#Bits Indication)|       | | Backup  }
+-+-+-+-+-+-+-+-+-+                         | One   } paths    |
| PN1 Index   | #Bits indicated by ENSI }    backup | for Link|
+-+-+-+-+-+-+-+-+-+                         | path for| between |
~              ~                             | link  | LN1 and |
+-+-+-+-+-+-+-+-+-+                         |       | RN10    |
| PNm Index   | #Bits indicated by ENSI_|    |       |         |
+-+-+-+-+-+-+-+-+-+                                  |         |
//                  //                              _|.........|
+-+-+-+-+-+-+-+-+-+-+-+
| RN20's Index    |          CNI (9 bits) for RN20   ¯
+-+-+-+-+-+-+-+-+-+                                  | Node RN20
|K|                          1 bit(Critical Node Flag) } with
+-+-+-+-+-+-+-+-+-+-+-+                              | backup paths
~ Backup paths for RN20 ~                           _| encoding
+-+-+-+-+-+-+-+-+-+-+-+-+
: Link LN1-RN20 with     :
. backup paths encoding  .
+-+-+-+-+-+-+-+-+-+-+-+
| RN30's Index    |          CNI (9 bits) for RN30   ¯
+-+-+-+-+-+-+-+-+-+                                  | Node RN20
|K|                          1 bit(Critical Node Flag) } with
+-+-+-+-+-+-+-+-+-+-+-+                              | backup paths
~ Backup paths for RN30 ~                           _| encoding
+-+-+-+-+-+-+-+-+-+-+-+-+
: Link LN1-RN30 with     :
. backup paths encoding  .
+-+-+-+-+-+-+-+-+-+-+-+-+
```

*FIG. 21*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     LNSBP-TLV-Type (TBD8)     |          TLV-Length           |
+-+-+-+-+-+-+-+-+-+-+-+-+-+-+-+-+-+-+-+-+-+-+-+-+-+-+-+-+-+-+-+-+
:         Links from Node 1 with backup paths encoding          :
+-+-+-+-+-+-+-+-+-+-+-+-+-+-+-+-+-+-+-+-+-+-+-+-+-+-+-+-+-+-+-+-+
:         Links from Node 2 with backup paths encoding          :
+-+-+-+-+-+-+-+-+-+-+-+-+-+-+-+-+-+-+-+-+-+-+-+-+-+-+-+-+-+-+-+-+
:                                                               :
.                                                               .
+-+-+-+-+-+-+-+-+-+-+-+-+-+-+-+-+-+-+-+-+-+-+-+-+-+-+-+-+-+-+-+-+
:         Links from Node N with backup paths encoding          :
+-+-+-+-+-+-+-+-+-+-+-+-+-+-+-+-+-+-+-+-+-+-+-+-+-+-+-+-+-+-+-+-+
```

*FIG. 22*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            LS age             |    Options    |  LS Type = 10 |
+-+-+-+-+-+-+-+-+-+-+-+-+-+-+-+-+-+-+-+-+-+-+-+-+-+-+-+-+-+-+-+-+
|FTBP Type(TBD9)|                 Instance ID                   |
+-+-+-+-+-+-+-+-+-+-+-+-+-+-+-+-+-+-+-+-+-+-+-+-+-+-+-+-+-+-+-+-+
|                       Advertising Router                      |
+-+-+-+-+-+-+-+-+-+-+-+-+-+-+-+-+-+-+-+-+-+-+-+-+-+-+-+-+-+-+-+-+
|                       LS Sequence Number                      |
+-+-+-+-+-+-+-+-+-+-+-+-+-+-+-+-+-+-+-+-+-+-+-+-+-+-+-+-+-+-+-+-+
|         LS checksum           |            Length             |
+-+-+-+-+-+-+-+-+-+-+-+-+-+-+-+-+-+-+-+-+-+-+-+-+-+-+-+-+-+-+-+-+
|                                                               |
~                    Links with Backup Paths TLV                ~
+-+-+-+-+-+-+-+-+-+-+-+-+-+-+-+-+-+-+-+-+-+-+-+-+-+-+-+-+-+-+-+-+
```

*FIG. 23*

SYSTEM AND METHOD TO RECOVER FROM LINK OR NODE FAILURE IN A NETWORK

CLAIM FOR PRIORITY

This application is a continuation of and claims the benefit of priority to PCT/US2019/063987, filed Dec. 2, 2019, which claims the benefit of priority to U.S. Provisional App. 62/773,571, filed Nov. 30, 2018, the entire contents of which are hereby incorporated by reference.

FIELD

The disclosure relates to network communication, and in particular to distribution of flooding network topologies.

BACKGROUND

A wide variety of devices connect to service provider networks to access resources and services provided by packet-based data networks, such as the Internet, enterprise intranets, content providers and virtual private networks (VPNs). For example, many fixed computers utilize fixed communication links, such as optical, digital subscriber line, or cable-based connections, of service provider networks to access the packet-based services. In addition, a vast amount of mobile devices, such as cellular or mobile smart phones and feature phones, tablet computers, and laptop computers, utilize mobile connections, such as cellular radio access networks of the service provider networks, to access the packet-based services. A flooding topology may represent the underlying (i.e., physical) topology, and may be split when one or more failures occur in a link or node of the topology. As a result, link state updates are not properly forwarded within the topology and the link state databases may not be synchronized.

BRIEF SUMMARY

According to one aspect of the present disclosure, there is provided a network with one or more nodes, comprising a first node including a processor, a receiver and a transmitter to compute a flooding topology, represented by links between the one or more nodes in the network, and alternative connections for the links and the one or more nodes on the flooding topology; detect a change in the flooding topology, the change indicating the failure in the network and resulting in a split of the flooding topology; flood a link state message to each of the one or more nodes in a remaining part of the flooding topology and to the alternative connections, the link state message identifying the failure in the network; and resolve the failure in the network by connecting the split flooding topology using the remaining part of the flooding topology and the alternative connections as identified in the link state message.

According to still one other aspect of the disclosure, there is a computer-implemented method for recovering from a failure in a network, comprising computing a flooding topology, represented by links between one or more nodes in the network, and alternative connections for the links and the one or more nodes on the flooding topology; detecting a change in the flooding topology, the change indicating the failure in the network and resulting in a split of the flooding topology; flooding a link state message to each of the one or more nodes in a remaining part of the flooding topology and to the alternative connections, the link state message identifying the failure in the network; and resolving the failure in the network by connecting the split flooding topology using the remaining part of the flooding topology and the alternative connections as identified in the link state message.

Optionally, in any of the preceding aspects, the method further comprising identifying one or more critical nodes in the flooding topology, where failure of the one or more critical nodes results in the flooding topology being split; and identifying one or more critical links in the flooding topology between the critical node and the one or more nodes in the network, where failure of the one or more critical links results in the flooding topology being split.

Optionally, in any of the preceding aspects, wherein the alternative connection is between two end nodes of the link on the flooding topology or a path crossing one of the nodes on the flooding topology, and the method further comprising distributing the link state message, including the alternative connection, to the two end nodes to connect the split flooding topology when the one or more critical links fail; and distributing the link state message, including the path crossing the one of the nodes, to connect the split flooding topology when the critical node fails.

Optionally, in any of the preceding aspects, the method further comprising computing a new flooding topology based on the connected flooding topology; and sending a status of the link state to an adjacent node over a link attached to the node when the link is not on the flooding topology, the link is on the new flooding topology, and a failure occurs on the network after the flooding topology has been computed.

Optionally, in any of the preceding aspects, wherein the status of the link state is one of the link state that the node originates or receives during a period of time in which the flooding topology is split, and the link state with the change that the node originates or receives during the period of time in which the flooding topology is split.

Optionally, in any of the preceding aspects, wherein the period of time is one of a sum of a maximum amount of time in which link states containing changes take to flood the flooding topology, the maximum amount of time in which to compute a new flooding topology, and the maximum amount of time in which the new flooding topology is distributed to the one or more nodes in a network area.

Optionally, in any of the preceding aspects, wherein each of the one or more nodes include a link state database, the method further comprising synchronizing the link state database in any one of the nodes in the network with any other adjacent node over a link on the new flooding topology.

Optionally, in any of the preceding aspects, the method further comprising originating a link state message with a first flag set to indicate a local link failure when one of the nodes detects a local link failure; and sending the link state message to each of the links attached to the node in the flooding topology, except to the failed local link.

Optionally, in any of the preceding aspects, the method further comprising receiving a link state message with a link state, the link state identifiable by a first flag set to indicate a local link failure; determining the failed local link by comparing a link state in a link state database of the node to the link state received in the link state message; and sending the received link state in the link state message to links attached to the node, except to the failed local link, when the failed local link is on the flooding topology and a number of hops from the node to the node originating the link state message is less than a specified number.

Optionally, in any of the preceding aspects, the method further comprising originating a link state message with a first flag set to indicate a local link failure when one of the nodes detects a local link failure; and sending the link state message to each of the nodes links on the flooding topology, except to the failed local link, including local links on the alternative connections for an adjacent node.

Optionally, in any of the preceding aspects, the method further comprising receiving a link state message with a link state, the link state identifiable by a first flag set to indicate a local link failure; determining the failed local link by comparing a link state in a link state database of the node to the link state received in the link state message; and sending the link state message to each of the nodes links on the flooding topology, except to the failed local link, including local links on the alternative connections for an adjacent node.

Optionally, in any of the preceding aspects, the method further comprising receiving a link state message with a link state, the link state identifiable by a first flag set to indicate a local link failure; determining the failed local link by receiving the link state message with the first flag set to indicate a local link failure from two end nodes of the local link; and sending the link state message to each of the nodes links on the flooding topology, except to the failed local link or the link from which the link state message was received.

Optionally, in any of the preceding aspects, the method further comprising originating a link state message with a first flag set to indicate a local link failure and a second flag set to indicate a local node failure when failure of an adjacent node over a local link is detected; and sending the link state message to each of the links attached to the node on the flooding topology, except to the failed local link.

Optionally, in any of the preceding aspects, the method further comprising receiving a link state message with a first flag set to indicate a local link failure and a second flag set to indicate no local node failure when failure of an adjacent node over a local link is detected; determining the failed local link by receiving the link state message with the first flag set to indicate a local link failure; and sending the link state message to each of the nodes links on the flooding topology, except to the failed local link or the link from which the link state message was received.

Optionally, in any of the preceding aspects, the method further comprising receiving a link state message with a first flag set to indicate a local link failure and a second flag set to indicate a local node failure when failure of an adjacent node over a local link is detected; determining the failed local link by receiving the link state message with the first flag set to indicate a local link failure and a second flag set to indicate a local node failure; and sending the link state message to each of the nodes links on the flooding topology, except to the failed local link or the link from which the link state message was received.

Optionally, in any of the preceding aspects, the method further comprising detecting two or more adjacent node failures; originating a link state message with a first flag set to indicate a local link failure when the node detects a local link failure; and sending the link state message to each of the nodes links on the flooding topology, except to the failed local link.

Optionally, in any of the preceding aspects, the method further comprising detecting two or more adjacent node failures; receiving a link state message with a link state, the link state identifiable by a first flag set to indicate a local link failure; determining the failed local link and the two or more adjacent nodes by comparing the link state in the link state database with the link state received in the link state message; and sending the link state message to each of the nodes links on the flooding topology, except to the failed local link or the link from which the link state message was received.

According to yet another aspect of the disclosure, there is provided a device for path computation and setup in a network, comprising a non-transitory memory storage comprising instructions; and one or more processors in communication with the memory, wherein the one or more processors execute the instructions to compute a flooding topology, represented by links between one or more nodes in the network, and alternative connections for the links and the one or more nodes on the flooding topology; detect a change in the flooding topology, the change indicating the failure in the network and resulting in a split of the flooding topology; flood a link state message to each of the one or more nodes in a remaining part of the flooding topology and to the alternative connections, the link state message identifying the failure in the network; and resolve the failure in the network by connecting the split flooding topology using the remaining part of the flooding topology and the alternative connections as identified in the link state message.

According to still another aspect of the disclosure, there is provided a non-transitory computer-readable medium storing computer instructions for recovering from a failure in a network, that when executed by one or more processors, cause the one or more processors to perform the steps of computing a flooding topology, represented by links between one or more nodes in the network, and alternative connections for the links and the one or more nodes on the flooding topology; detecting a change in the flooding topology, the change indicating the failure in the network and resulting in a split of the flooding topology; flooding a link state message to each of the one or more nodes in a remaining part of the flooding topology and to the alternative connections, the link state message identifying the failure in the network; and resolving the failure in the network by connecting the split flooding topology using the remaining part of the flooding topology and the alternative connections as identified in the link state message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 5-16 illustrate messages for backup paths in accordance with embodiments of the disclosure.

FIGS. 17-24 illustrate backup paths in links for Type-Length-Value.

DETAILED DESCRIPTION

Figure 1:
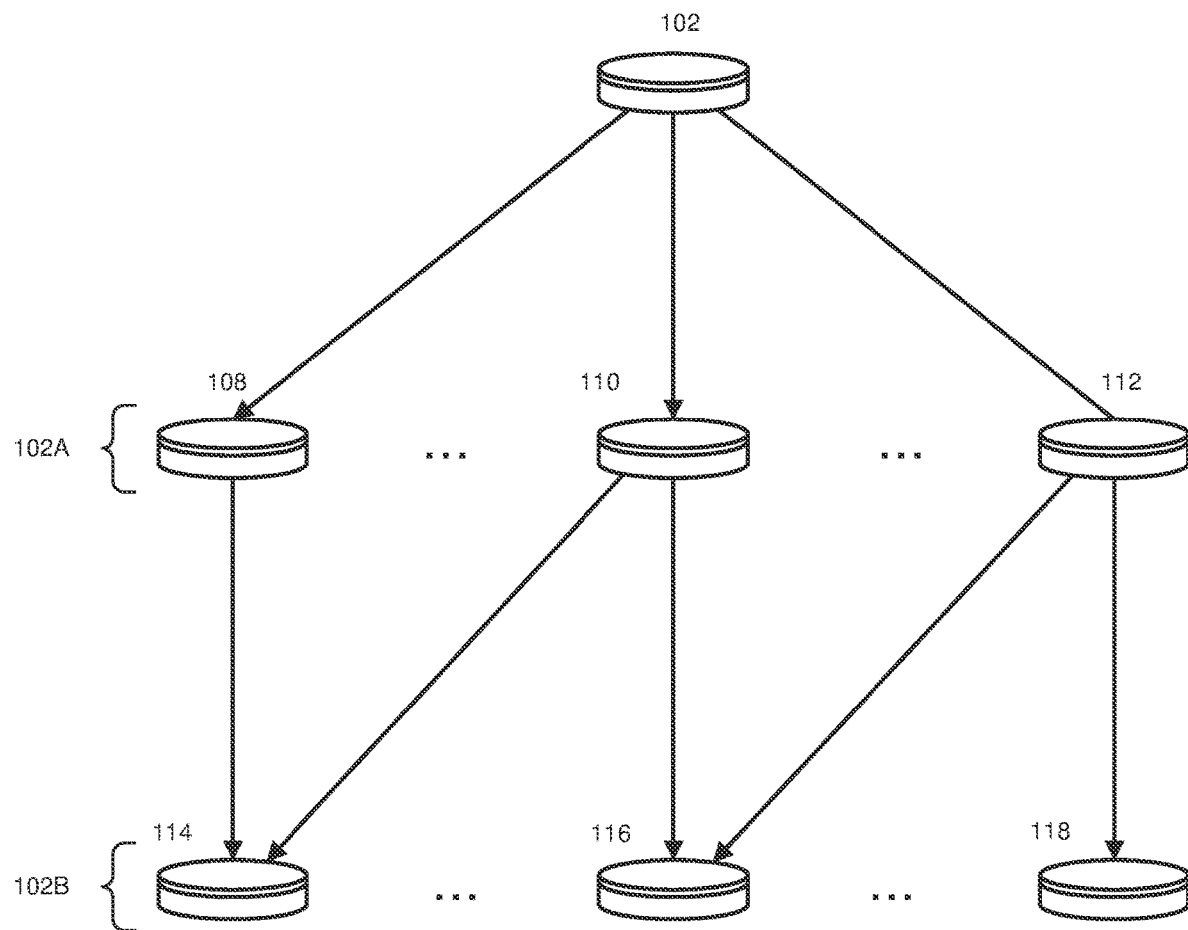
FIG. 1 shows an example of flooding a network topology.

The present disclosure will now be described with reference to the figures, which in general relate to a driver attention detection.

The technology relates to computation of backup paths for links and nodes in a flooding topology such that when a failure of one or more links or nodes occurs the failure(s) may be detected and quickly and resolved by flooding a link state advertisement to nodes in the network.

Communicating link state messages (e.g., links state advertisement or link state protocol data unit) from a node to all other nodes in a network domain is referred to as flooding. The disclosed mechanisms recover from a failure (i.e., link and/or node failure) in the network. In general, each node floods the network by transmitting link state messages over the flooding topology without transmitting such messages across network links that are excluded from the flooding topology. For example, the flooding topology may be generated as a tree of links (e.g., a spanning tree) that connects the nodes. Such a tree of links allows a link state message, such as a link state advertisement (LSA) or link state protocol (LSP) data unit, to be flooded to all nodes while ensuring each node receives a single copy of the flooded message. In the event of failure of a link or node, the system is able to recover using the remaining flooding topology and backup paths (or alternative connections).

The backup paths may be provided across the flooding topology in the event a link or node fails or malfunctions. Additionally, when a link or node fails, a node adjacent to the malfunction can communicate link state messages to other nodes that are adjacent to the failure. The nodes may also retain knowledge of critical elements. A critical element is a flooding topology link/interface or node that, upon failure, splits the flooding topology into two or more parts. Upon notification of the failure of a critical element, the nodes may recover and resynchronize by flooding link state messages over links in a new flooding topology (that does not include the failed element) in order to maintain network functionality.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

As more and more nodes (e.g., routers) are added into a conventional communications network, the size of the network increases, and issues such as scalability and slow convergence may arise. In communication networks such as the Internet, an autonomous system (AS) may have a common routing policy (either in a single network or in a group of networks) that is controlled by a network administrator (or group of administrators on behalf of a single administrative entity, such as a university, a business enterprise, or a business division). Within the Internet, an AS comprises a collection of routers exchanging routing information via a common routing protocol. Each AS on the Internet may be assigned a globally unique number, which is sometimes called an AS number (ASN).

In a network comprising a single autonomous system (AS) with a single area, each node needs to be aware of the positional relationships (i.e., adjacencies) of all other nodes, such that all nodes may build a topological map (topology) of the AS. Nodes may learn about one another's adjacencies by distributing (i.e., flooding) link-state information throughout the network according to one or more Interior Gateway Protocols (IGPs) including, but not limited to, open shortest path first (OSPF) or intermediate system (IS) to IS (ISIS). Specifically, nodes engaging in IGPs may distribute their own link state messages (e.g., LSAs or LSPs) describing their own adjacencies to all their neighboring nodes, which may forward the received LSAs to all their neighboring nodes (except the node from which the LSA was received). This may allow the LSA to be distributed throughout the network such that all network nodes become aware of one another's adjacencies, thereby allowing the various nodes to build topology graphs, which may be stored and form link state databases (LSDBs).

LSAs may be distributed upon network initialization as well as whenever a network adjacency changes—e.g., a node is added/removed or a node/link fails. When such an adjacent change (or state change) occurs, the LSDB of a node may no longer be synchronized with other nodes in its network area. Likewise, nodes not directly adjacent to the failed node or link may not readily detect failures, thereby preventing link states from being properly transmitted along a backup path to resynchronize the LSDBs. The present disclosure provides a mechanism in which to resolve these and other issues.

FIG. 1 shows an example of flooding a network topology using a link state message. The network may include a flooding node 102 that performs flooding of link state messages to nodes 108-112 in a set of neighbors 102A that are directly connected to the flooding node 102. Some or all of the neighbors may operate as subsequent flooding nodes by re-flooding the link state messages to nodes 114-118 in a set of neighbor's neighbors 102B (i.e., two-hop neighbors of the flooding node).

Flooding node 102 and nodes 108-118 may be routers and/or other types of switching nodes in a packet-switched network. As a result, link state messages transmitted from the flooding node to neighbors 102A, and subsequently to two-hop neighbors 102B, may be used by the switching nodes to update their routing tables based on changes in connectivity within the network. For example, a change in the reachability of a node, destination, and/or link in the network may be detected by the flooding node 102. The flooding node 102 may use a link state protocol such as Open Shortest Path First (OSPF) and/or intermediate System to Intermediate System (IS-IS) to flood a link state message containing the change in reachability to neighbors 102A. As each neighbor 102A receives the link state message, the neighbor may operate as the flooding node and flood the link state message to the neighbor's neighbors 102B (i.e., two-hop neighbors of the flooding node), with the exception of the node from which the link state message was received. Flooding of the link state message may thus be used to propagate the link state message across the network. After the link state message is received at a node, the node may recalculate paths in one or more routing tables based on the change in reachability communicated in the link state message.

The following documents are incorporated herein by reference as if reproduced in their entirety: Internet Engineering Task Force (IETF) document entitled "LS Flooding Reduction" (draft-cc-lsr-flooding-reduction-01) by H. Chen et al., published Jan. 7, 2019, the entire contents of which are incorporated herein by reference.

Figure 2A:
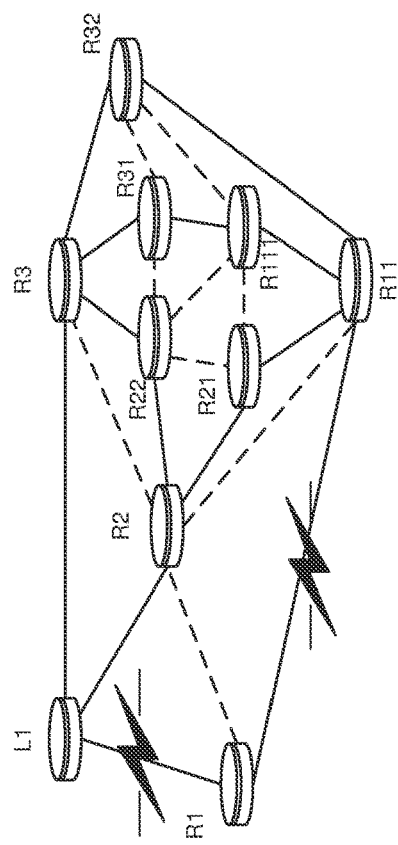
FIG. 2A illustrates an example embodiment of an OSPF network topology

FIG. 2A illustrates an example embodiment of an OSPF network topology. In the network topology, links between nodes are represented by lines (including dashed and darkened lines) which have been created as a result of flooding the network. Many different flooding topologies can be constructed for a network topology. A chain connecting all the nodes in the given network topology is a flooding topology. A circle connecting all the nodes is another type flooding topology. A tree connecting all the nodes is also a flooding topology. In addition, the tree plus the connections between some leaves of the tree and branch nodes of the tree is a flooding topology. A flooding topology is defined as a sub-graph or sub-network of the network topology that has the same reachability to every node as the network topology.

When constructing a flooding topology, such as the one depicted in FIG. 2A, the following parameters should be considered: (1) Number of links: The number of links on the flooding topology is a key factor for reducing the amount of link state flooding. In general, the smaller the number of links, the less the amount of link state flooding; (2) Diameter: The shortest distance between the two most distant nodes on the flooding topology (i.e., the diameter of the flooding topology) is a key factor for reducing the network convergence time. The smaller the diameter, the less the convergence time; and (3) Redundancy: The redundancy of the flooding topology means a tolerance to the failures of some links and nodes on the flooding topology. If the flooding topology is split by some failures, it is not tolerant to these failures. In general, the larger the number of links on the flooding topology is, the more tolerant the flooding topology to failures.

Similarly, there are many different ways to construct a flooding topology for a given network topology, including but not limited to: (1) Centralized Mode: One node in the network builds a flooding topology and floods the flooding topology to all the other nodes in the network (Note: Flooding the flooding topology may increase the flooding. The amount of traffic for flooding the flooding topology should be minimized.); (2) Distributed Mode: Each node in the network automatically calculates a flooding topology by using the same algorithm (No flooding for flooding topology); and (3) Static Mode: Links on the flooding topology are configured statically. Note that the flooding topology constructed by a node is dynamic in nature, such that when the base topology (the entire topology graph) changes, the flooding topology (the sub-graph) is re-computed/re-constructed to ensure that any node that is reachable on the base topology is also be reachable on the flooding topology.

The depicted example shows the flooding topology represented by twelve links in a single structure. In particular, the links on the flooding topology are shown between nodes L1 and R1; L1 and R2; L1 and R3; R1 and R11; R2 and R21; R2 and R22; R3 and R22; R3 and R31; R3 and R32; R11 and R32; R11 and R111; and R11 and R21, where L is defined as a local node and R is defined as a remote node. For the links between a local node (L) and multiple remote nodes (R), e.g., the three links between local node L1 and remote nodes R1, R2 and R3, the local node L1 is encoded and the remote nodes R1, R2 and R3 may be encoded in the same or a different manner. Once all the links in the flooding topology are encoded, the encoded links can be flooded to every node in the network. After receiving the encoded links, every node decodes the links and creates and/or updates the flooding topology. Encoding is described in related application PCT/US19/49372, filed Sep. 3, 2019, the entire contents of which are hereby incorporated by reference.

When a link and/or node in the flooding topology of FIG. 2A fails, the LSDB of the nodes will no longer be synchronized. In order to resynchronize the LSDB of the nodes, a new flooding topology may be computed. In a distributed mode, any node in the network may generated the new flooding topology. In a centralized mode, the node may receive the new flooding topology from a leader node. In either case, for a local link attached to the node, if 1) the link is not on the current flooding topology and is on the new flooding topology, and 2) there is a link or node failure after the current flooding topology is computed or received, then a resynchronization process is initiated. This beings by the node sending a delta (or status) of the link states that it received (or originated) to its adjacent node(s) over the link, a detailed explanation of which may be found below with reference to FIGS. 2B-2D.

As defined herein, a delta (or status) of the link states is any link states that may be out of synchronization with an adjacent node. In one embodiment, the delta of the link state is the link state that the node received or originated during a given period of time in which the current flooding topology is split. In another embodiment, the delta of the link state is the link state with changes that the node received or originated during a given period of time in which the current flooding topology is split. A given period of time is defined herein as the sum of the maximum time in which link states containing changes derived from the failures crosses the flooding topology, the maximum time in which a new flooding topology is computed, and/or the maximum time in which the new flooding topology is distributed to every node in the network area (in a centralized mode). In still another embodiment, the given period of time is configured to be a constant such as 10 seconds. In this case, the node sends the delta of the link states (i.e., the link states that the node received or originated during the past 10 seconds) to its adjacent node over the link. The node may send the link states with changes that it received or originated during the past 10 seconds to its adjacent node over the link. This resynchronization will make sure that the LSDBs are synchronized among all the active nodes in the network area even when a flooding topology is split as a result of link and/node failures.

Figure 2B:
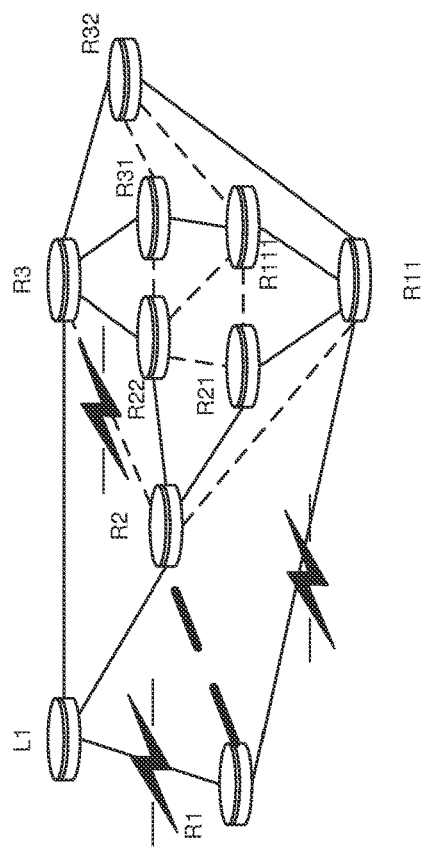
FIGS. 2B-2D illustrate an example synchronization of a split flooding topology.
Figure 2C:
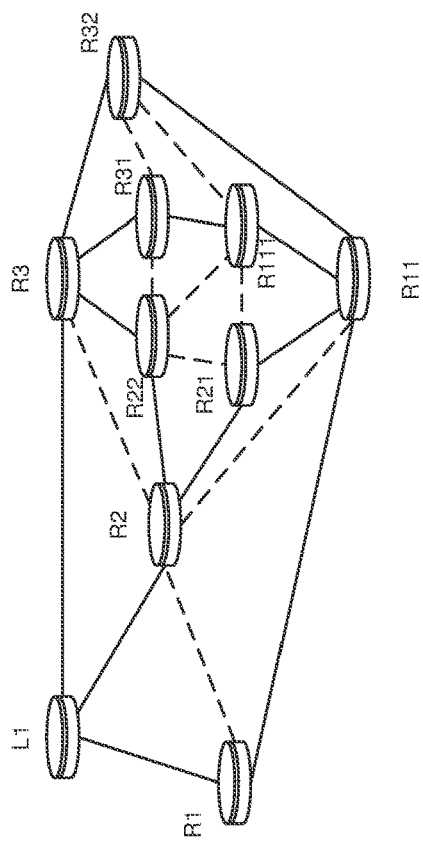
Figure 2D:
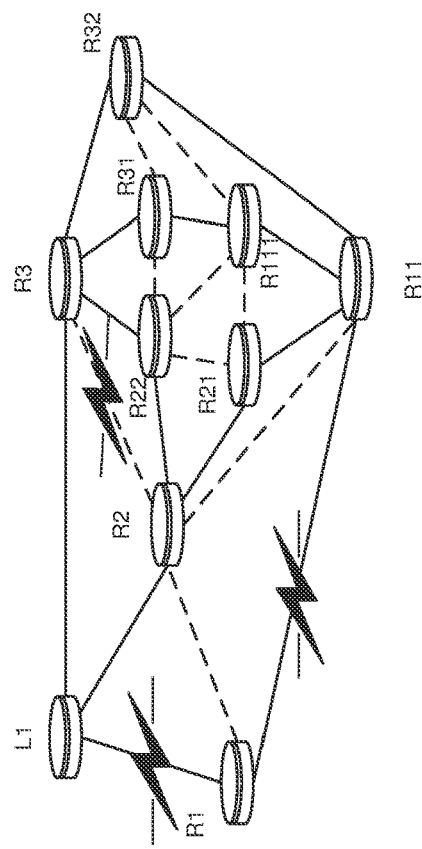

FIGS. 2B-2D illustrate an example synchronization of a split flooding topology. For purposes of discussion, let us assume that initially two links fail in the flooding topology of FIG. 2A. For example, if links L1-R1 and R1-R11 fail at nearly the same time, the current flooding topology is split into two parts. A first part is represented by remote node R1, and the second part is represented by the remainder of the network, as shown in FIG. 2B. Before a new flooding topology is computed, a further change occurs on the network topology, such as the link between remote nodes R2 and R3 failing, as shown in FIG. 2C. Remote nodes R2 and R3, to which the link R2-R3 is attached, originate their respective link states (LSs) to reflect the change. For example, remote node R2 originates the LS (e.g., a router LSA in OSPF) containing five links R2 to L1, R2 to R1, R2 to R11, R2 to R21 and R2 to R22 (the link R2 to R3 is not included since it failed). Remote node R3 originates the LS containing four links R3 to L1, R3 to R22, R3 to R31 and R3 to R32 (the link R3 to R2 is not included since it failed). The LSs are then distributed to all the nodes in the network through the current flooding topology, except for remote node R1 (since the LSs cannot be distributed to remote node R1 through the current flooding topology). After a new flooding topology is computed, as show in FIG. 2D, the link between remote nodes R1 and R2 no longer exists in the current flooding topology. On the new flooding topology, remote node R2 sends remote node R1 the delta link states, which are the LSs received or originated by R2 (the aforementioned five links) while the current flooding topology is split.

Figure 3A:
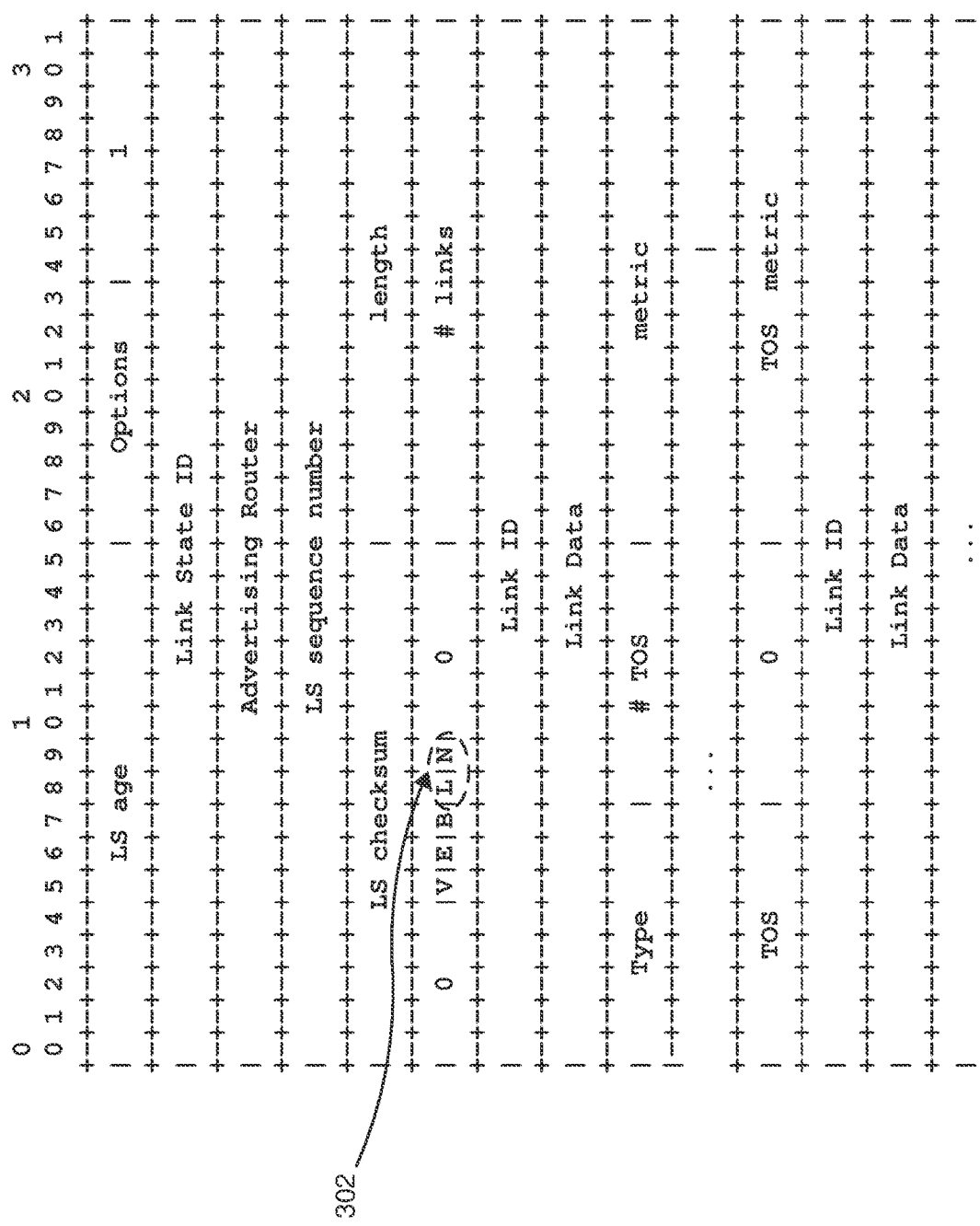
FIGS. 3A-3C illustrate a packet format in which to extend a link state message during a critical link or node failure.
Figure 3B:
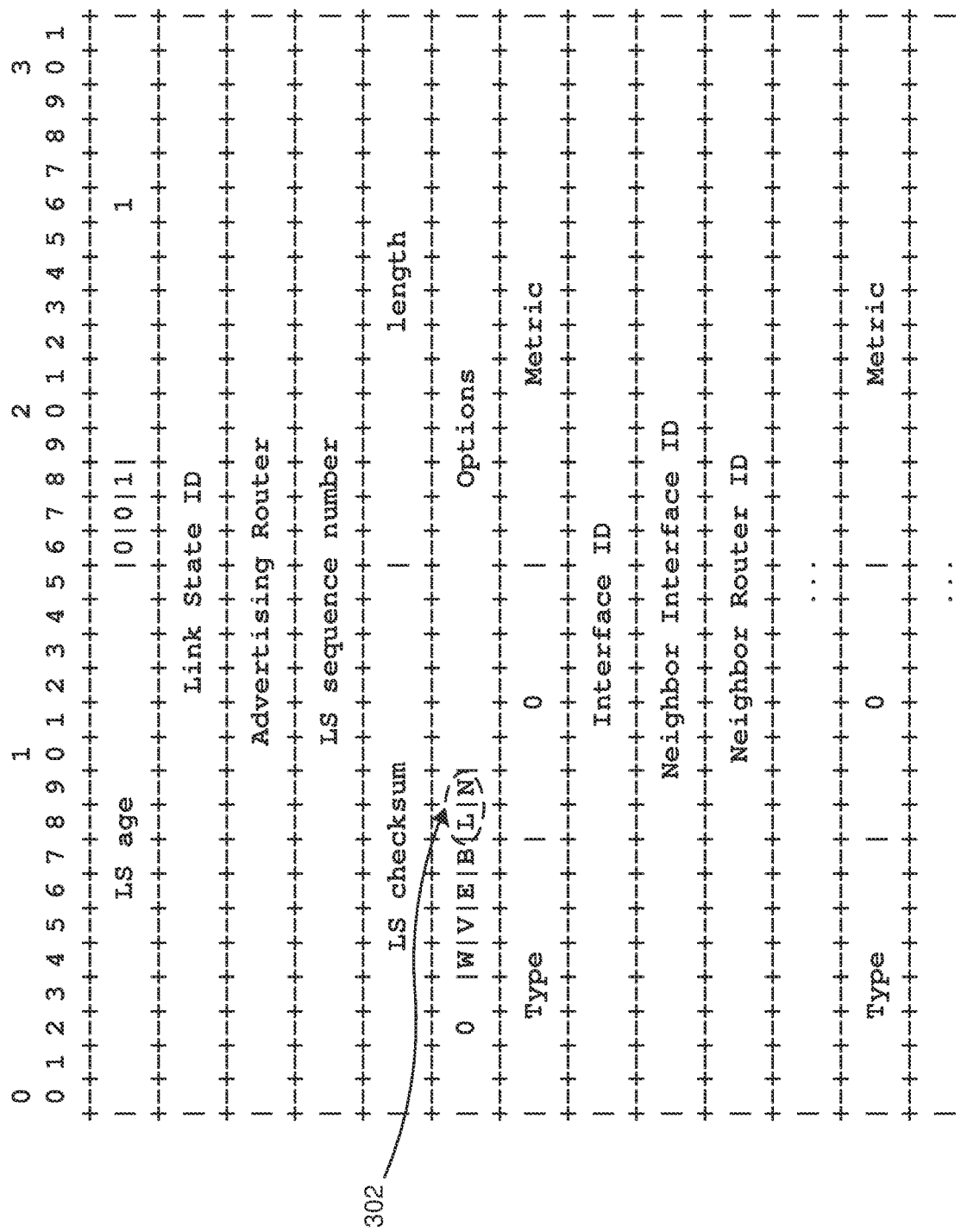
Figure 3C:
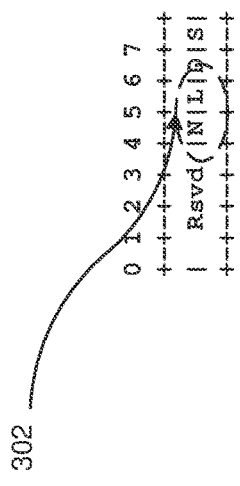

FIGS. 3A-3C illustrate a packet format in which to extend a link state message during a critical link or node failure. A critical link (or interface) is a link among one or more nodes on the flooding topology that, when the link fails, the flooding topology will be split. A critical node is a node that connects one or more nodes on the flooding topology that, when the node fails, the flooding topology will be split. When a critical link or node on the flooding topology fails, the remaining flooding topology—a topology from a flooding topology by removing the failed links and nodes from the flooding topology, is split into parts. A backup path for the critical link/node connects the split parts into a single topology. That is, a backup path is a path or sequence of links that provides an alternative connection between two end nodes of a path crossing a node in on the flooding topology. Using the backup paths and the remaining flooding topology, a link state (LS) can be quickly flooded to every active node (via active links) in the network to resolve the failure and reconnect the split flooding topology (i.e., recovering from the failure in the network). In one embodiment, the two end nodes between the failed link may indicate a link failure to other nodes by sending an LS with a flag (e.g., a bit flag) set to indicate the failure. In another embodiment, when a node along the backup path receives the LS, it can quickly determine that a link failure has occurred and floods the LS (and any other LS) using the backup path for the failed link and the remaining topology.

An extended packet format for type-1 router LSA in OSPF (v2 and v3) is shown in FIGS. 3A and 3B. A node (e.g., router) originates a router-LSA for each area that it belongs to. Such an LSA describes the collected states of the router's links to the area. The LSA is flooded throughout the particular network area (unless it is also a designated router for other area networks). Using flags in the packet, the node also indicates whether it is an area border router by setting bit flag B, or an AS boundary router by setting bit flag E in its router-LSAs. A bit flag V may also be set indicates that the router is an endpoint of one or more fully adjacent virtual links having the described areas as Transit area. In one embodiment, the flags are extended to include two new flags 302—Flags L and N. Flag L is defined in the OSFP router LSA as follows: a router sets flag L to "1" in the LSA when a local ink attached to it fails, and sets flag L to "0" in the LSA when no local ink failure is detected. Flag N is defined in the OSFP router LSA as follows" a router sets N to "1" in the LSA when its adjacent node fails and the failure of the node is detected, and sets the flag N to "0" in the LSA when no adjacent node failure is detected. FIG. 3A shows the extended packet format for type-1 LSA in OSPFv2, and FIG. 3B shows the extended packet format for type-1 in LSA for OSPFv3.

In additional to the bit flags, the LSA also includes the following fields: The number of router links indicates the total collection or router links to the area. The additional fields are used to describe each router link: Each router link is "typed." The Type field indicates the kind of link being described. It may be a link to a transit network, to another router or to a stub network. The values of all the other fields describing a router link depend on the link's Type. For example, each link has an associated 32-bit Link Data field. The link ID identifies the object that this router link connects to. When connecting to an object that also originates an LSA (i.e., another router or a transit network) the Link ID is equal to the neighboring LSA's Link State ID. This provides the key for looking up the neighboring LSA in the LSDB during the routing table calculation. The link data value also depends on the link's Type field. The #TOS is the number of different TOS metrics given for this link, not counting the required link metric (referred to as the TOS 0 metric). For example, if no additional TOS metrics are given, this field is set to 0. Finally, the TOS metric is the cost of using this router link.

Turning to FIG. 3C, extensions to ISIS are illustrated. As explained in Internet Engineering Task Force (IETF) document entitled "IS-IS Extensions for Advertising Router Information" by Ginsberg et al., published October 2016, the entire contents of which are incorporated herein by reference, a new optional Intermediate System to Intermediate System (IS-IS) Type-Length-Value (TLV) named CAPABILITY, formed of multiple sub-TLVs, which allows a router to announce its capabilities within an IS-IS level or the entire routing domain. The ISIS Router Capability TLV is composed of 1 octet for the type, 1 octet that specifies the number of bytes in the value field, and a variable length value field that starts with 4 octets of Router ID, indicating the source of the TLV, followed by 1 octet of flags. The octet of flags is shown in FIG. 3C, with two new flags 302—Flags L and N. Flags L and N are set as explained above in the OSFP example.

Figure 4A:
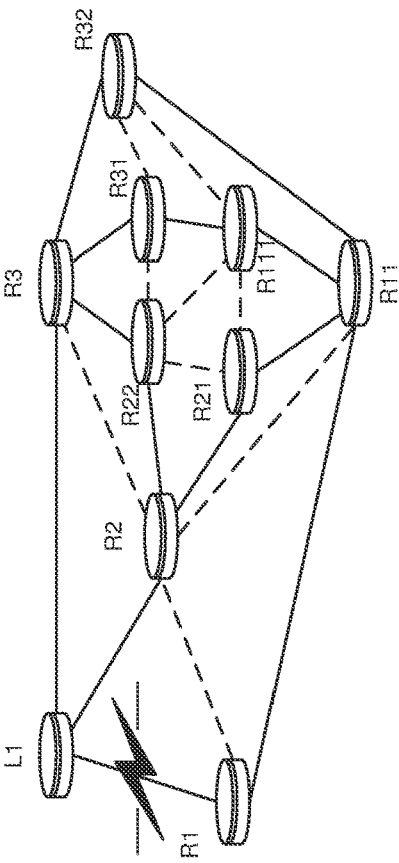
FIGS. 4A-4C illustrate examples of connecting split parts into a single part.
Figure 4C:
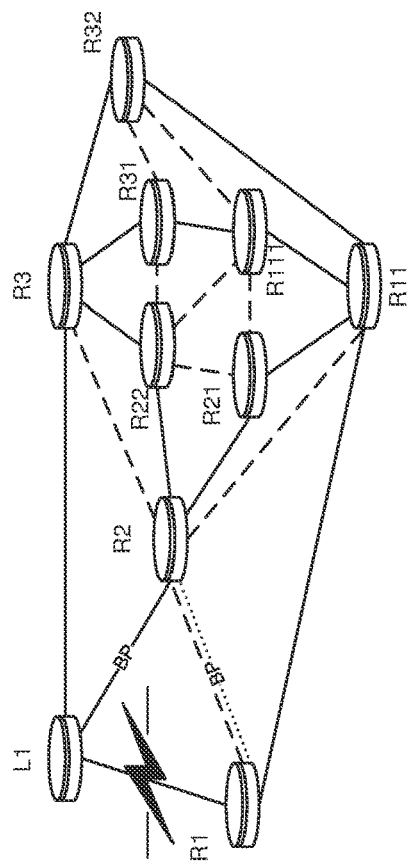
Figure 4B:
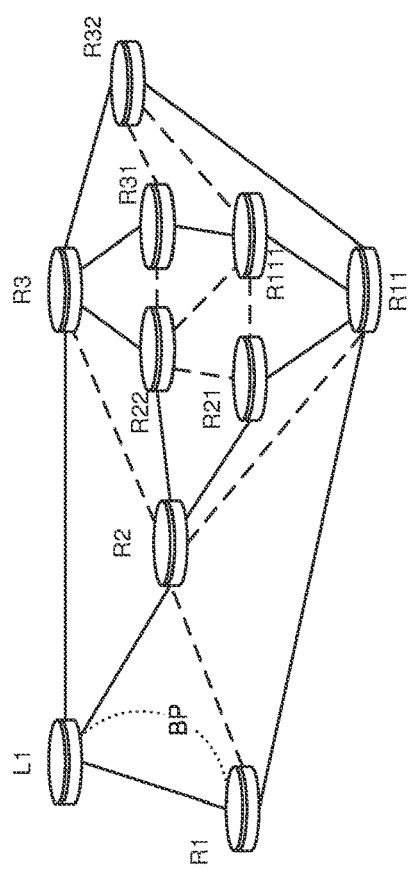

FIGS. 4A-4C illustrate examples of connecting split parts into a single part. The connection of a flooding topology split into parts may be accomplished using anyone of the following four methodologies—the Approximate Method, the Method considering link failure as node failure, the Method using link failure and node failure or the Method considering adjacent node failures.

Approximate Method

When a node detects its local link failure (i.e., a link attached to the node fails), it originates a link state (LSA in OSPF or LSP in ISIS) with a Flag L set to "1." The link state is sent to each of the nodes other links (except for the failed local link). The link state reflects the link failure, i.e., the link state does not contain the failed link. When a node receives a link state with Flag L=1, it determines the failed link by comparing the corresponding link state in its own LSDB with the received Flag L. The failed link is determined by the link in the link state of the node's LSDB, not in the link state just received. The received link state is then sent to each of the node's other links, except for the link from which the link state is received, if the failed link is on the flooding topology and the number of hops from the node to the originator of the link state is less than a specified number, such as 4 hops.

In one embodiment, when a link or a node fails, each of the nodes that are within 1 hop from the failure (i.e., failed link or node) sends the link state it receives or originates to each of the links, except for the link from which the link state is received. For example, and with reference to FIG.

4A, when the link between L1 and R1 fails, each of the nodes that are within 1 hop from the failure (i.e., failed link L1-R1) sends the link state it receives or originates to each of the links, except for the link from which the link state was received. In this case, the link state is sent to local and remote nodes L1, R1, R11, R2 and R3, as they are within 1 hop from the failed link L1-R2. All the other nodes do not receive the link state.

Link Failure as Node Failure

In one embodiment, a local node detects a link failure. When the node detects a local link failure, an adjacent node over the local link may have failed. However, the node cannot determine whether the local link has failed or the adjacent node has failed. Accordingly, the node considers the link failure as the adjacent node failure. Upon detection of the local link failure, the node originates a link state (LSA in OSPF or LSP in ISIS) with Flag L set to "1." The link state reflects the link failure, but does not contain the failed link itself. In one embodiment, the node assumes that the local links on the backup paths for the adjacent node are on the current flooding topology until a new flooding topology is computed or received. The link state is then sent to each of the other links on the flooding topology (except for the failed local link failed). In another embodiment, the node sends the link state to each of the other links (except for the failed local link).

In another embodiment, the node receives the LSA with Flag L=1, but cannot determine the remote side of the link. Thus, when a node receives a link state with Flag L=1, the node determines the failed link or node by comparing the corresponding link state in the node's LSDB with the one received. The failed link is determined by the link in the link state of the node's LSDB, not in the link state just received. The failed link is the link in the link state in its LSDB but not in the link state just received. The failed node is the node on the other end of the failed link (one end is the node originating the link state). In one embodiment, the node assumes that the local links on the backup paths for the failed node are on the current flooding topology until a new flooding topology is computed or received, and sends the link state to each of the other links on the flooding topology (except for the one from which the link state is received). In another embodiment, the node sends the link state to each of the other links (except for the one from which the link state is received).

In still another embodiment, the node receives an LSA with a Flag L=1 and determines the remote side of the link has failed or remains active. Thus, when a node receives a link state with L=1, the node determines the failed link, but not a failed node on the link. The failed link is the link in the link state of the node's LSDB, but not in the link state received. Also, since a failed node was not detected on the link upon receiving the link state from two end nodes of the link, this indicates the same link has failed. In one embodiment, the node assumes that the local links on the backup path for the failed link are on the current flooding topology (in this case, the local links on the backup paths for the failed node assumed before are removed from the flooding topology since the node does not fail) until a new flooding topology is computed or received. The links state is then sent to each of the other links on the flooding topology, except for the local link failed or the link from which the link state is received. In another embodiment, the node sends the link state to each of the other links, except for the local link failed or the link from which the link state is received.

Several different embodiments exists in which to compute and store the backup path(s). In one embodiment, the backup path for a link (e.g., the failed link), and the backup paths for a node (e.g., the failed node) are computed by the node that receives the link state when a new flooding topology is computed or received. The node stores a backup path (e.g., into its LSDB) if the backup path goes through the node. On the other hand, the node stores an indication that the backup paths are computed for the link and the node if the backup path does not through the node and no backup path is stored in the node's LSDB for the link and the node.

In another embodiment, the backup path for a link (e.g., the failed link), and the backup paths for a node (e.g., the failed node) are computed and flooded by a leader, and the node, which receives the link state, receives the backup paths. The node stores the backup path (e.g., into its LSDB) if the backup path goes through the node. On the other hand, the node stores an indication that the backup paths are received for the link and the node if the backup path does not pass through the node and no backup path is stored in the node's LSDB for the link and the node.

In still another embodiment, a backup path for a link is computed by the node that receives the link state. The node stores the backup path (e.g., into its LSDB) if the backup path goes through the node. The node stores an indication indicating that the backup path is computed for the link if the backup path computed does not pass through the node and no backup path is stored in its LSDB for the link. The backup path and indication stored in the LSDB are removed or updated when network topology changes. The backup paths for a node (e.g., failed node) are computed by the node that receives the link state, and the node stores a backup path (e.g., into its LSDB) if the backup path passes through the node. The node stores an indication that the backup paths are computed for the node if the backup paths computed do not pass through the node and no backup path is stored in its LSDB for the node. The backup paths and indication stored in the LSDB are removed or updated when network topology changes.

In a further embodiment, the node need not compute a backup path for every link or node in a network area. Rather, the node may simply compute a backup path for each of the links or nodes which the backup path passes through. For each of links or nodes for which the backup path does not pass through, the node does not need to perform the computation.

In one example of computing and storing a backup path, a node starts to compute a backup path for each of the links or other nodes that is m hops away from node, where m starts at 0 and increases by 1. When m reaches a specified number (e.g., 8), such that the backup path computed for each of the links and other nodes that is m hops away from the computing node does not go through the node, the node stops computing the backup path for each of the other links and other nodes (since the backup path for the other links and nodes will not pass through the computing node).

FIGS. 4B and 4C illustrate an example embodiment of treating a link failure as a node failure. With reference to FIG. 4B, the illustrated network topology shows a backup path (BP) for link L1-R1 is link L1-R2-R1. When link L1-R1 fails, the links on the backup path for the failed link L1-R1 are on the flooding topology temporarily (i.e., the links on the backup path L1-R2-R1 for the failed link L1-R1 are temporarily added into the flooding topology, if necessary) until a new flooding topology is computed or received. For example, as shown in FIG. 4C, since link R1-R2 is on the backup path, but does not exist on the flooding topology, it is temporarily added (represented by the dotted line between R1 and R2). Link L1-R2, on the other hand, already exists on the flooding topology. Accordingly, there is no need to add the link on the backup path temporarily (i.e., the link exists).

When remote node R1 detects a local link R1 to L1 failure, the remote node R1 originates a link state (LSA in OSPF or LSP in ISIS) with Flag L set to "1," and links remote node R1 to R11 and remote node R1 to R2 (link R1 to L1 is not included since it failed). Remote node R1 temporarily adds the link R1 to R2 on the backup path for the failed link R1-L1 on the flooding topology, and sends the link state to each of the links on the flooding topology (i.e., links R1 to R11 and R1 to R2). Similarly, when link L1 detects a local link L1 to R1 failure, a link state (LSA in OSPF or LSP in ISIS) is originated with Flag L set to "1," and links L1 to R2 and L1 to R2 (link L1 to R1 is not included since it failed). The link L1 to R2 on the backup path for the failed link R1-L1 already exists on the flooding topology and need not be added. Link L1 then sends the link state to each of the links on the flooding topology (i.e., links L1 to R2 and L1 to R3).

When R2 receives the link state originated by remote node R1 or link L1, which indicates link R1 to L1 or L1 to R1 has failed, then remote node R2 temporarily adds the link R2 to R1 on the backup path for the failed link R1-L1 on the flooded topology. Remote node R2 then sends the newly received (or originated) link state to each of the links on the flooding topology (except for the link from which the link state is received). For example, when link R2-R3 fails before a new flooding topology is computed or received, remote node R2 originates a link state containing five links R2 to L1, R2 to R1, R2 to R11, R2 to R21 and R2 to R22 without link R2 to R3, and sends the link state to each of the links on the flooding topology (i.e., links R2 to L1, R2 to R1, R2 to R21 and R2 to R22).

Link Failure and Node Failure

In one embodiment, a node detects a local link and an adjacent (e.g., 1 hop) node failure. When a local link failure occurs, Flag L is set to "1" and the link state indicates a link failure (not a node failure). In one example, when a node detects a local link failure, the node originates a link state (LSA in OSPF or LSP in ISIS) with Flag L set to "1." In this case, the link state reflects the link failure, not the failed link. In one embodiment, the node assumes that the local links on the backup path for the link are on the current flooding topology, until a new flooding topology is computed or received. Once computer or received, the node sends the link state to each of the other links on the flooding topology (except for the local link failed). In another embodiment, the node sends the link state to each of the other links (except for the local link failed). In yet another embodiment, the node sends the link state to each of the other links on the flooding topology (except for the local link failed) if the failed link is not a critical link.

In another embodiment, when a node detects an adjacent node over a local link fails, the node originates a link state (LSA in OSPF or LSP in ISIS) with Flag L set to "1" and Flag N set to "1." As before, the link state reflects the link failure, not the failed link. In one embodiment, the node assumes that the local links on the backup paths for the adjacent node are on the current flooding topology, until a new flooding topology is computed or received. Then, the node sends the link state to each of the other links on the flooding topology (except for the local link failed). In one embodiment, the node sends the link state to each of the other links (except for the local link failed). In still another embodiment, the node sends the link state to each of the other links on the flooding topology (except for the local link failed) if the failed link is not a critical.

In still another embodiment, when a node receives a link state with Flag L set to "1" and Flag N set to "0," the node detects a failed link (without a failed node) on the link. In this case, the failed link is the link in the link state in the node's LSDB, but not in the link state received. In one embodiment, the node assumes that the local links on the backup path for the failed link are on the current flooding topology, until a new flooding topology is computed or received. Once computed or received, the node sends the link state to each of the other links on the flooding topology (except for the local link failed or the link from which the link state is received). In another embodiment, the node sends the link state to each of the other links (except for the local link failed or the link from which the link state is received). In yet another embodiment, the node sends the link state to each of the other links on the flooding topology (except for the local link failed or the link from which the link state is received) if the failed link is not a critical link.

In still another embodiment, when a node receives a link state with Flag L set to "1" and Flag N set to "1," the node detects the failed link and node on the link. The failed link is the link in the link state in the node's LSDB, but not in the link state received. The failed node is the node on the other end of the failed link (one end is the node originating the link state). In one embodiment, the node assumes that the local links on the backup paths for the failed node are on the current flooding topology, until a new flooding topology is computed or received. The node then sends the link state to each of the other links on the flooding topology (except for the local link failed or the link from which the link state is received). In yet another embodiment, the node sends the link state to each of the other links (except for the local link failed or the link from which the link state is received). In still one other embodiment, the node sends the link state each of the other links on the flooding topology (except for the local link failed or the link from which the link state is received) if the failed node is not a critical node on the flooding topology.

Adjacent Nodes Failure

In one embodiment, when two or more adjacent nodes fail at the same time (or nearly the same time), which results in a split of the flooding topology into two or more parts, the backup paths for the nodes are computed to connect the split parts into a single part.

In one example, when a node detects a local link failure, the node originates a link state (LSA in OSPF or LSP in ISIS) with Flag L set to "1." The link state reflects the link failure, i.e., the link state does not contain the failed link. In one embodiment, the node assumes that the local link on the backup path for the adjacent node is on the current flooding topology, until a new flooding topology is computed or received. The node then sends the link state to each of the other links on the flooding topology (except for the local link failed). In another embodiment, the node sends the link state to each of the other links (except for the local link failed). In still another embodiment, the node sends the link state to each of the other links on the flooding topology (except for the local link failed) if the failed link is not a critical link.

In another example, when a node receives a link state with Flag L set to "1," the node detects the failed link and node by comparing the corresponding link state in the node's LSDB with the one received. In this case, the failed link is the link in the link state in the node's LSDB, but not in the link state received. The failed node is the node on the other end of the failed link (one end is the node originating the link state). In one embodiment, the node assumes that the local link on the backup path for the failed node is on the current flooding topology, until a new flooding topology is computed or received. The node then sends the link state to each of the other links on the flooding topology (except for the local link failed or the link from which the link state is received). In another embodiment, the node sends the link state to each of the other links (except for the local link failed or the link from which the link state is received). In still another embodiment, the node sends the link state to each of the other links on the flooding topology (except for the local link failed or the link from which the link state is received) if the failed node is not a critical node.

In a further example, when a node receives a link state with Flag L set to "1," the node detects the failed link (and not a failed node on the link). The failed link is the link in the link state in the node's LSDB, but not in the link state received. The non-failure of the node on the link is determined by receiving the link state from the two end nodes of the link, which indicates the same failed link. In one embodiment, the node assumes that the local links on the backup path for the failed link are on the current flooding topology (the local links on the backup paths for the failed node assumed before are removed from the flooding topology since the node has not failed), until a new flooding topology is computed or received. The node then sends the link state to each of the other links on the flooding topology (except for the local link failed or the link from which the link state is received). In another embodiment, the node sends the link state to each of the other links (except for the local link failed or the link from which the link state is received). In yet another embodiment, the node sends the link state to each of the other links on the flooding topology (except for the local link failed or the link from which the link state is received) if the failed link is not a critical link.

In still one other embodiment, when a node N receives a link state with Flag L set to "1," the node detects the failed link and another node N1 which is adjacent to another failed node N2. In this case, the failed link is the link in the link state in the node's LSDB, but not in the link state received. The failed node N1 is the node on the other end of the failed link (one end is the node originating the link state). Failed node N2 is a failed node, which has previously been detected as filing and is adjacent to the failed node N1. The backup paths for the adjacent node failures are computed if needed. In one embodiment, node N assumes that the local links on the backup paths for the failed nodes are on the current flooding topology (the local links on the backup paths for the failed node N1 are removed from the flooding topology) until a new flooding topology is computed or received. The node then sends the link state to each of the other links on the flooding topology (except for the local link failed or the link from which link state is received). In another embodiment, the node sends the link state to each of the other links (except for the local link failed or the link from which the link state is received). In still another embodiment, the node sends the link state to each of the other links on the flooding topology (except for the local link failed or the link from which the link state is received) if the failed nodes are not critical nodes.

In one embodiment, the backup paths for two or more adjacent nodes (which fail at the same or nearly the same time) are computed by the node that receives the link state when a new flooding topology is computed or received. The node stores a backup path (e.g., into the LSDB) if the backup path passes through the node. The node stores an indication that the backup paths are computed for these adjacent nodes if the backup paths computed do not pass through the node, and a backup path is not stored in its LSDB.

In another embodiment, the backup paths for two or more adjacent nodes are computed and flooded by a leader, and the node, which receives the link state, receives the backup paths. It stores a backup path (e.g., into its LSDB) if the backup path goes through the node. The node stores an indication indicating that the backup paths are received/computed for the these adjacent nodes if the backup paths received do not through the node and there is not any backup path stored in its LSDB for these nodes.

In still a further embodiment, the backup paths for two or more adjacent nodes (which fail at the same or nearly the same time) are not computed or received. Rather, the node computes the backup paths for the failed adjacent nodes, and stores a backup path (e.g., into the LSDB) if the backup path passes through the node. The node stores an indication that the backup paths are computed for the adjacent nodes if the backup paths computed does not pass through the node and a backup path is not stored in the node's LSDB for these nodes. When a new flooding topology is computed or received, the backup paths and indication stored in the LSDB are removed or updated.

In one other embodiment, the backup paths for two or more adjacent nodes (which fail at the same or nearly the same time) are computed by the node that receives the link state. The node stores a backup path (e.g., into the LSDB) if the backup path passes through the node. The node stores an indication that the backup paths are computed for the adjacent nodes if the backup paths computed do not pass through the node and a backup path is not stored in the node's LSDB. The backup paths and indication stored in the LSDB are removed or updated when network topology changes.

Encoding for Backup Paths

When the leader of an area computes a flooding topology, it may compute a backup path or multiple backup paths for a critical link on the flooding topology. When the critical link fails, a link state can be distributed to every node in the area through one backup path and other links on the flooding topology. In addition, it may compute a backup path or multiple backup paths for a node. When the node fails, a link state can be distributed to the other nodes in the area through the backup paths and the links on the flooding topology.

Although not the focus of this disclosure, FIGS. 5-24 illustrate various examples of encoding backup paths. Two types of encodings for backup paths are described—separated encoding and integrated encoding. In separated encoding, backup paths are encoded in a separated new message, where the message for the flooding topology is required. In integrated encoding, backup paths are integrated into the flooding topology links encoding, where one message contains the flooding topology and the backup paths.

Figure 5:
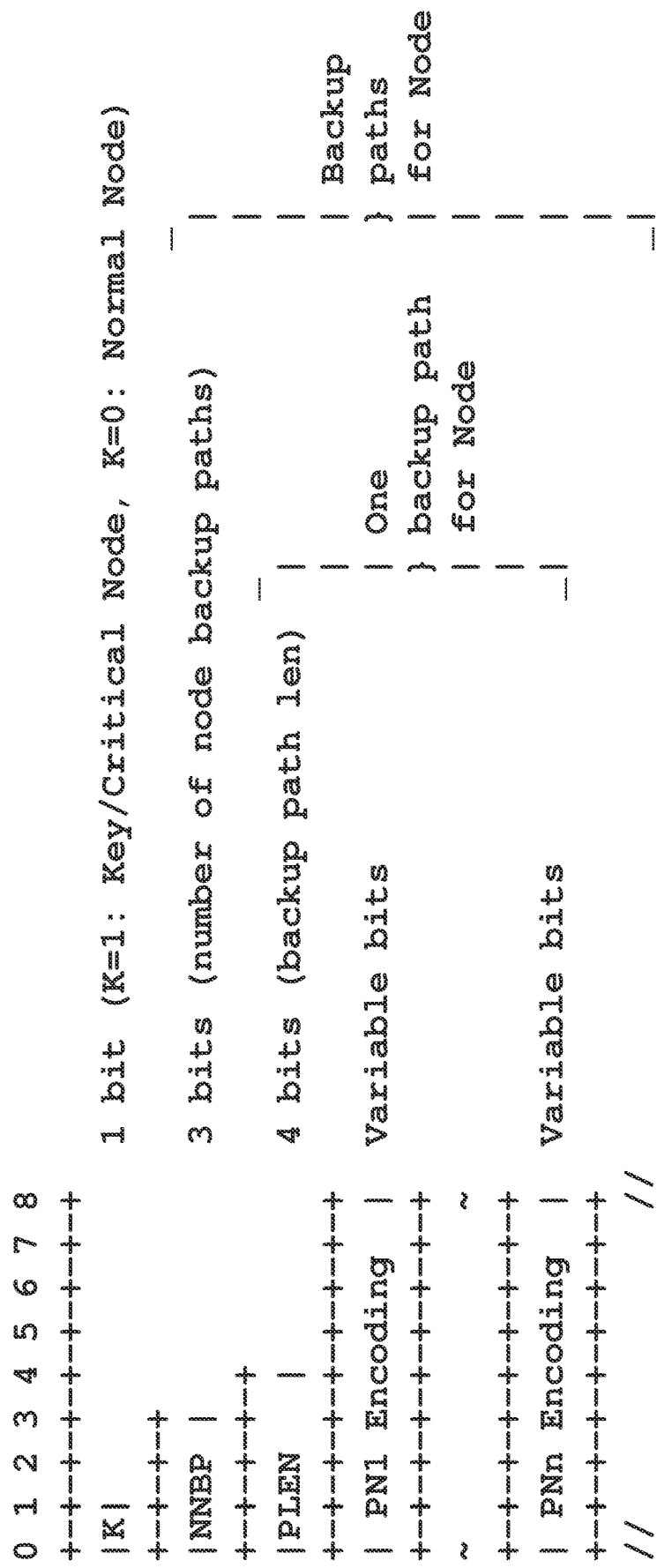

With reference to FIG. 5, the backup paths for a node may be represented by the node index encoding and node backup paths encoding. The node index encoding is similar to local node index encoding. The backup path encoding has a format as illustrated. The format comprises a Flag K (Key/Critical node flag) of 1 bit, a 3 bits NNBP field (number of node backup paths), and each of the backup paths encoding, which consists of the path length PLEN of 4 bits indicating the length of the path (i.e., the number of nodes), and the encoding of the sequence of nodes along the path such as encodings for nodes $PN_1, \ldots, PN_n$. The encoding of each node may use the encoding of a local node, which comprises encoded node index size indication (ENSI) and compact node index (CNI).

With reference to FIG. 6 illustrates another encoding of the sequence of nodes along the path uses one encoded node index size indication (ENSI) for all the nodes in the path. The Node Backup Paths Encoding illustrated in the figure.

With reference to FIG. 7 a new TLV referred to as a Node Backup Paths TLV is defined. The Node Backup Path TLV may include multiple nodes and their backup paths. Each node is represented by its index encoding, which is followed by its node backup paths encoding.

Figure 8:
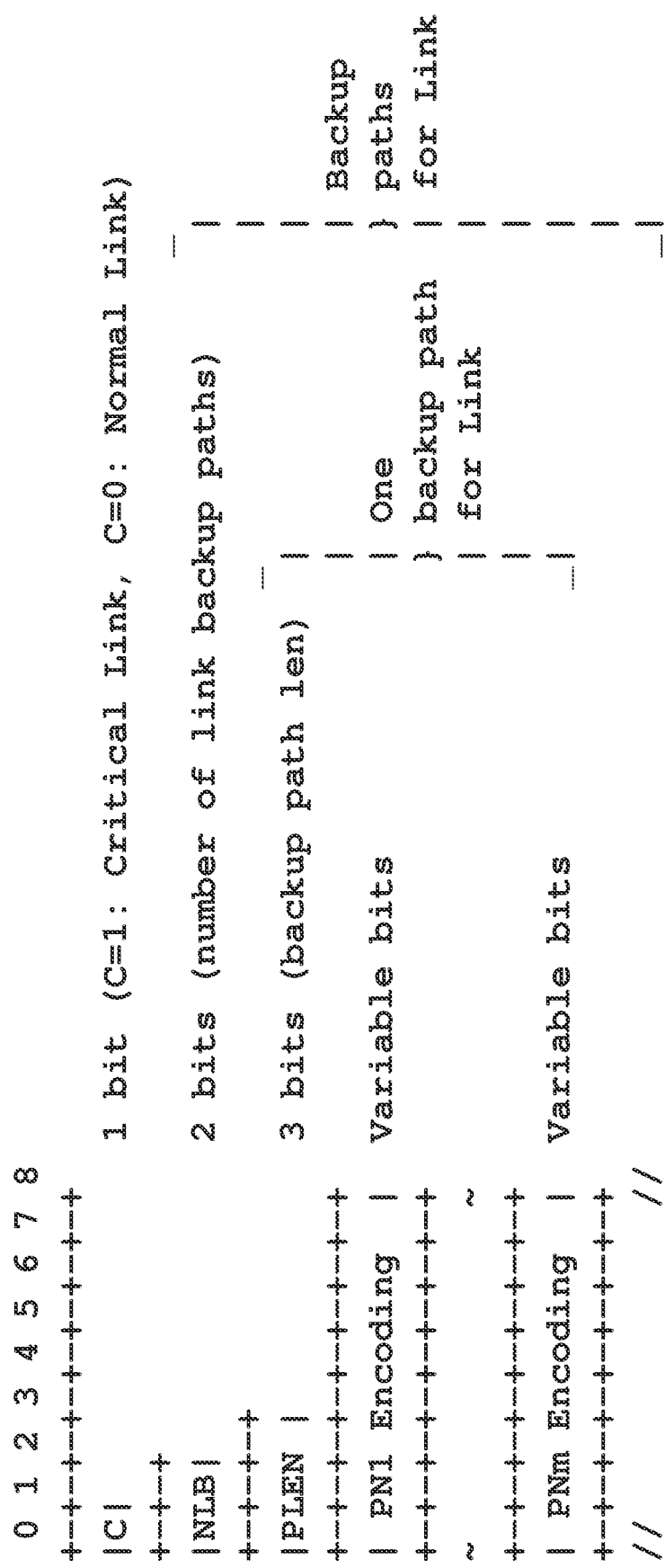

With reference to FIG. 8, the encoding for backup paths for a link on the flooding topology consists of the link encoding such as Link Index Encoding and the link backup paths encoding, which is similar to a local node encoding. The encoding contains encoded link index size indication (ELSI) and compact link index (CLI). The CLI has a format including a Flag C (Critical link flag) of 1 bit, a 2 bit NLB field (number of link backup paths), and each of the backup paths encoding, which consists of the path length PLEN of 3 bits indicating the length of the path (i.e., the number of nodes), and the encoding of the sequence of nodes along the path such as encodings for nodes PN1, ..., PNm. Two ends of a link (i.e., the local node and the remote node of the link) are not needed in the path to be encoded. The encoding of each node may use the encoding of a local node, which comprises encoded node index size indication (ENSI) and compact node index (CNI).

Figure 9:
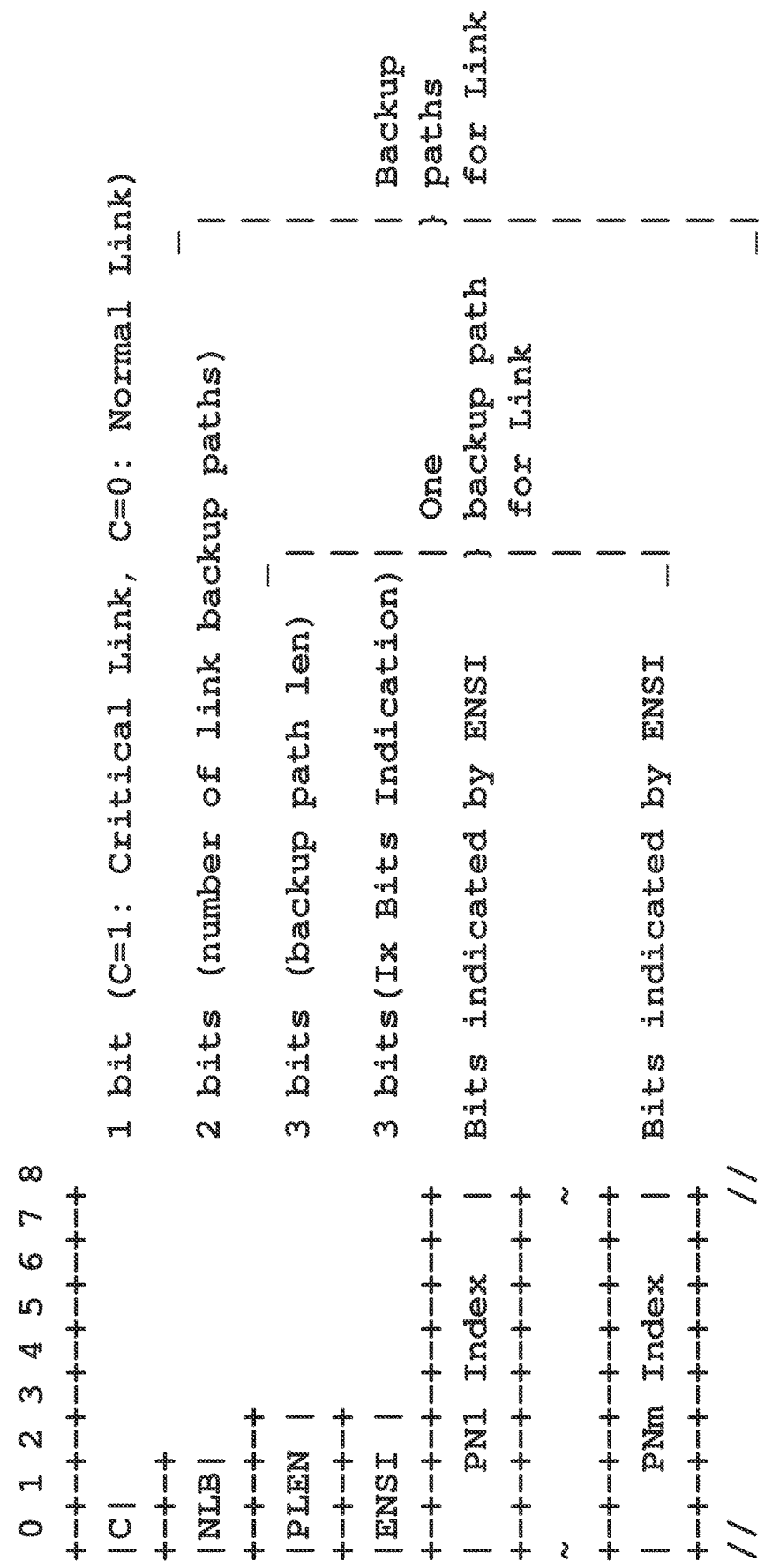

With reference to FIG. 9 encoding of the sequence of nodes along the path uses one encoded node index size indication (ENSI) for each of the nodes in the path. The Link Backup Paths Encoding is illustrated in the figure.

With reference to FIG. 10 a new TLV called Link Backup Paths TLV is defined as illustrated. The TLV may include multiple links (such as Link1, Link2, and so on) and their backup paths. Each link is represented by its index encoding, which is followed by its link backup paths encoding.

With reference to FIG. 11, for OSPFv2, an Opaque LSA of a new opaque type (TBD3) containing node backup paths TLVs and link backup paths TLVs is used to flood the backup paths from the leader of an area to all the other nodes in the area.

Figure 12:
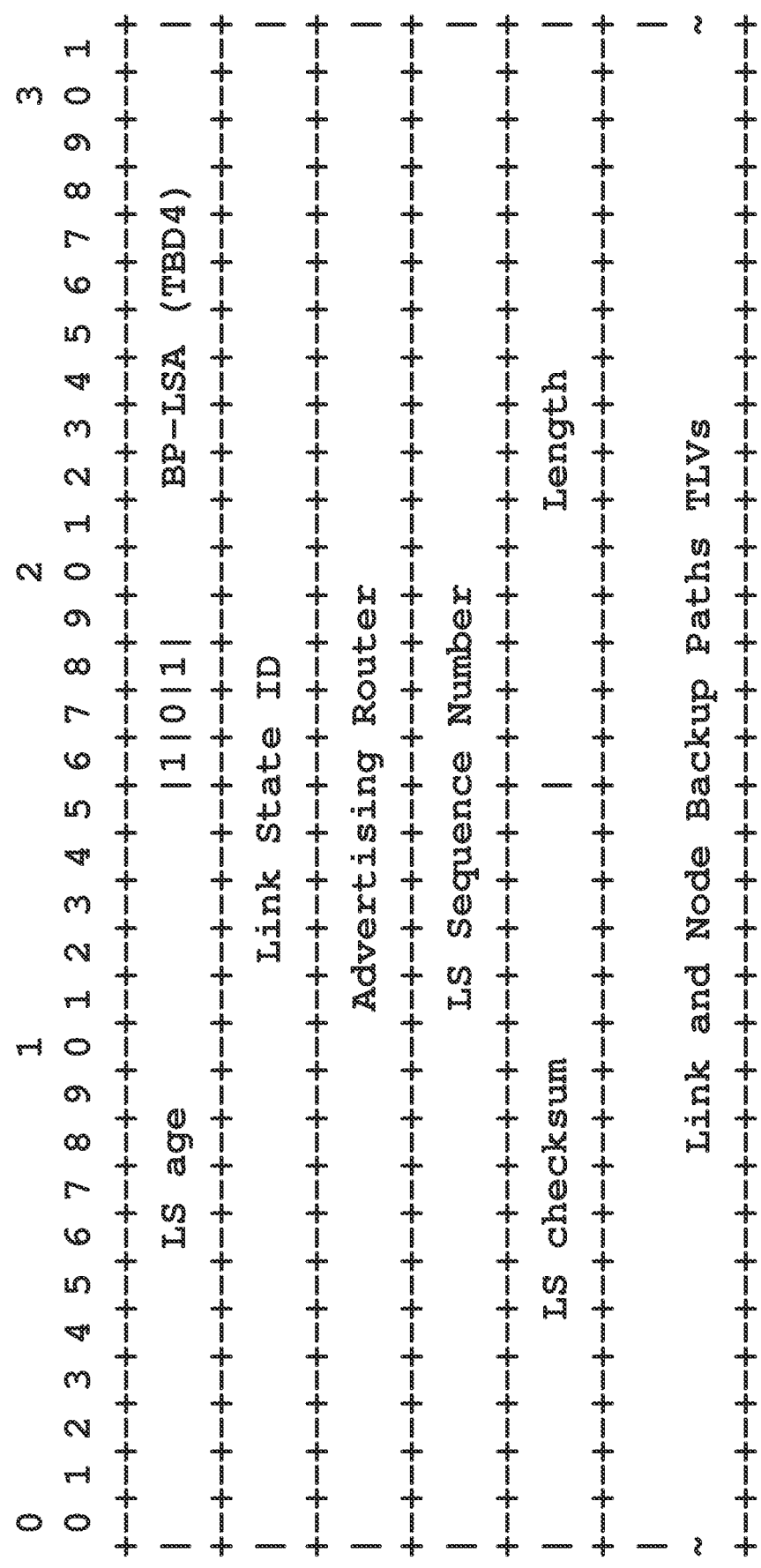

With reference to FIG. 12, for OSPFv3, an area scope LSA of a new LSA function code (TBD4) containing a Flooding Topology Links TLV is used to flood the flooding topology from the leader of an area to all the other nodes in the area.

Figure 13:
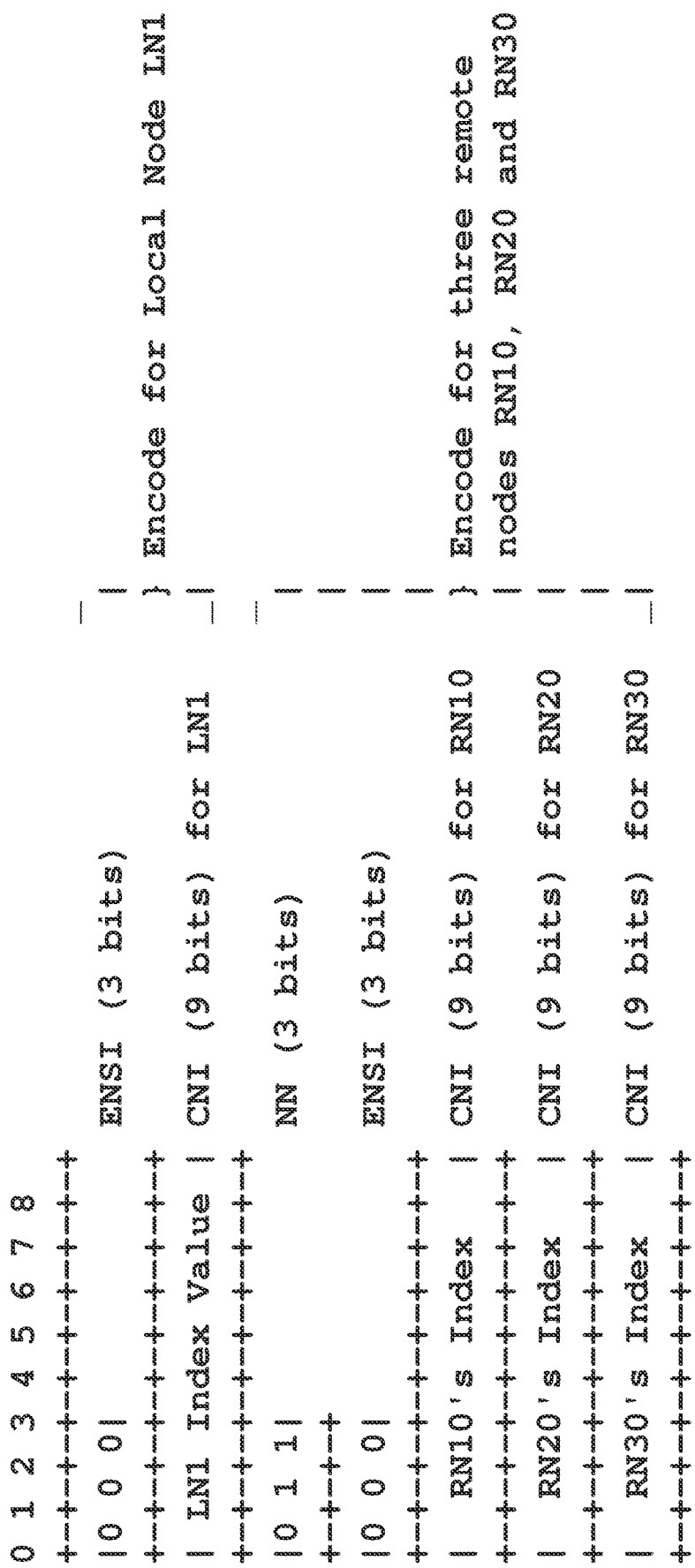

With reference to FIG. 13, the links between a local node and a number of remote nodes can be encoded as the local node followed by the remote nodes. For example, three links between local node LN1 and three remote nodes RN10, RN20 and R30 are encoded in 45 bits (i.e., 5.625 bytes).

With reference to FIG. 14, for a flooding topology computed by a leader of an area, the encoding may be represented by each of the links on the flooding topology. A TLV of the illustrated format for the links encodings can be included in an LSA to represent the flooding topology (FT) and flood the FT to each node in the area.

With reference to FIG. 15, for OSPFv2, an Opaque LSA of a new opaque type (TBD6) containing a Flooding Topology Links TLV is used to flood the flooding topology from the leader of an area to each of the other nodes in the area.

With reference to FIG. 16, for OSPFv3, an area scope LSA of a new LSA function code (TBD7) containing a Flooding Topology Links TLV is used to flood the flooding topology from the leader of an area to each of the other nodes in the area.

With reference to FIG. 17 a local node and backup paths can be encoded in the illustrated format, which is the local node (such as local node LN1) encoding followed by the local node backup paths encoding, which is the same as the node backup paths encoding described above.

With reference to FIG. 18, a remote node and backup paths can be encoded in the illustrated format, which is the remote node (such as remote node RN10) index value followed by the remote node backup paths encoding, which is the same as the node backup paths encoding described above.

With reference to FIG. 19, the links between a local node and a number of remote nodes, the backup paths for each of the nodes, and the backup paths for each of the links can be encoded in the illustrated format.

With reference to FIG. 20, for example, the illustrated data structure represents: three links between local node LN1 and three remote nodes RN10, RN20 and RN30; backup paths for node LN1, backup paths for node RN10, backup paths for node RN20, and backup paths for node RN30.

With reference to FIG. 21 In another example, the following data structure represents: three links between local node LN1 and three remote nodes RN10, RN20 and RN30; backup paths for node LN1, backup paths for node RN10, backup paths for node RN20, and backup paths for node RN30; backup paths for the link between node LN1 and node RN10, backup paths for the link between node LN1 and node RN20, and backup paths for the link between node LN1 and node RN30.

With reference to FIG. 22, a new TLV called Links with Backup Paths TLV is illustrated. The new TLV includes a number of Links from Node with Backup Paths Encodings described above. This TLV contains both the flooding topology and the backup paths for the links and nodes on the flooding topology.

With reference to FIG. 23, for OSPFv2, an Opaque LSA of a new opaque type (TBD9), called Flooding Topology with Backup Paths (FTBP) Opaque LSA, containing a Links with Backup Paths TLV, is used to flood the flooding topology with backup paths from the leader of an area to each of the other nodes in the area.

Figure 24:
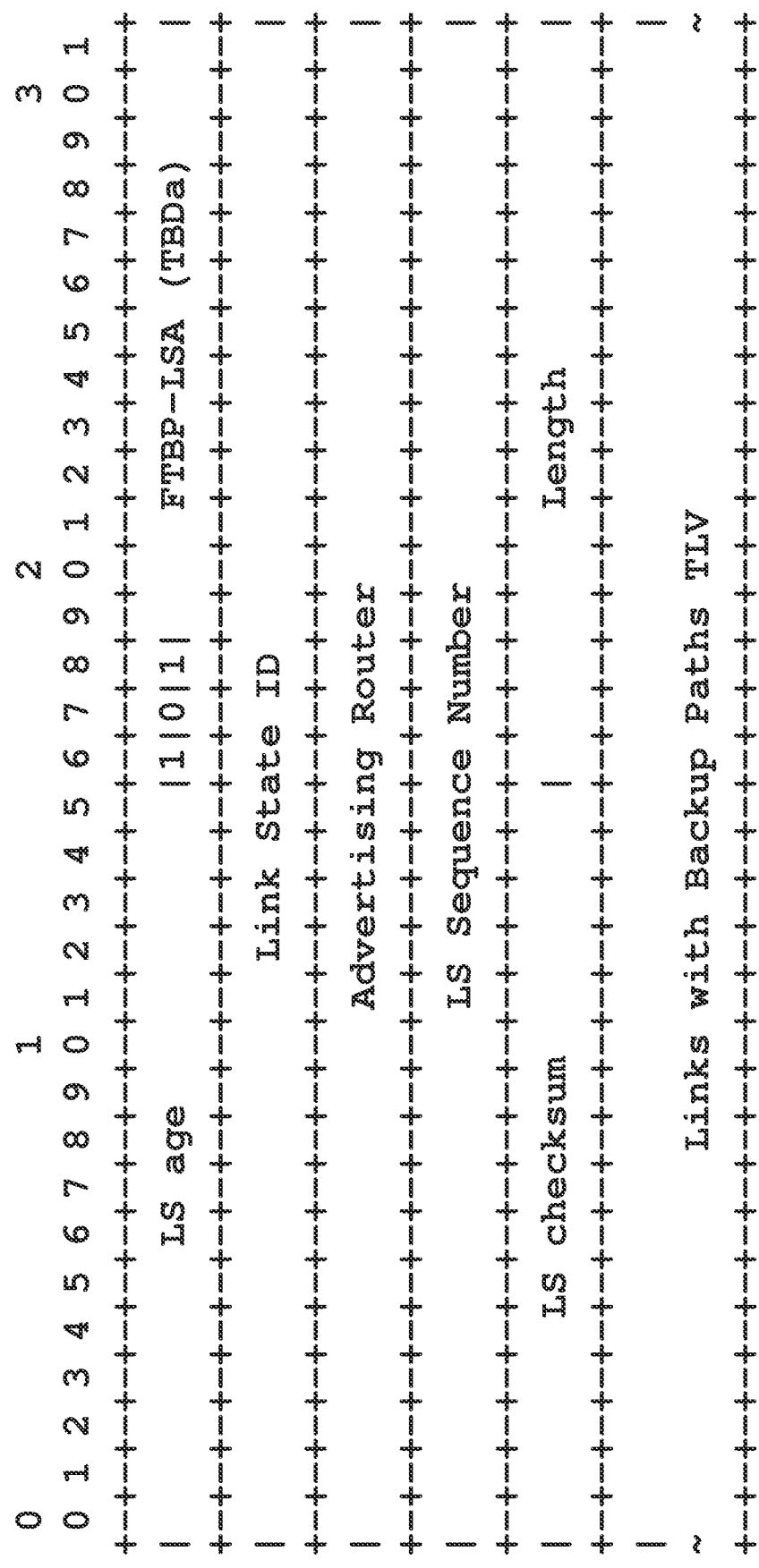

With reference to FIG. 24, for OSPFv3, an area scope LSA of a new LSA function code (TBDa) containing a Links with Backup Paths TLV is used to flood the flooding topology with backup paths from the leader of an area to each of the other nodes in the area.

Figure 25:
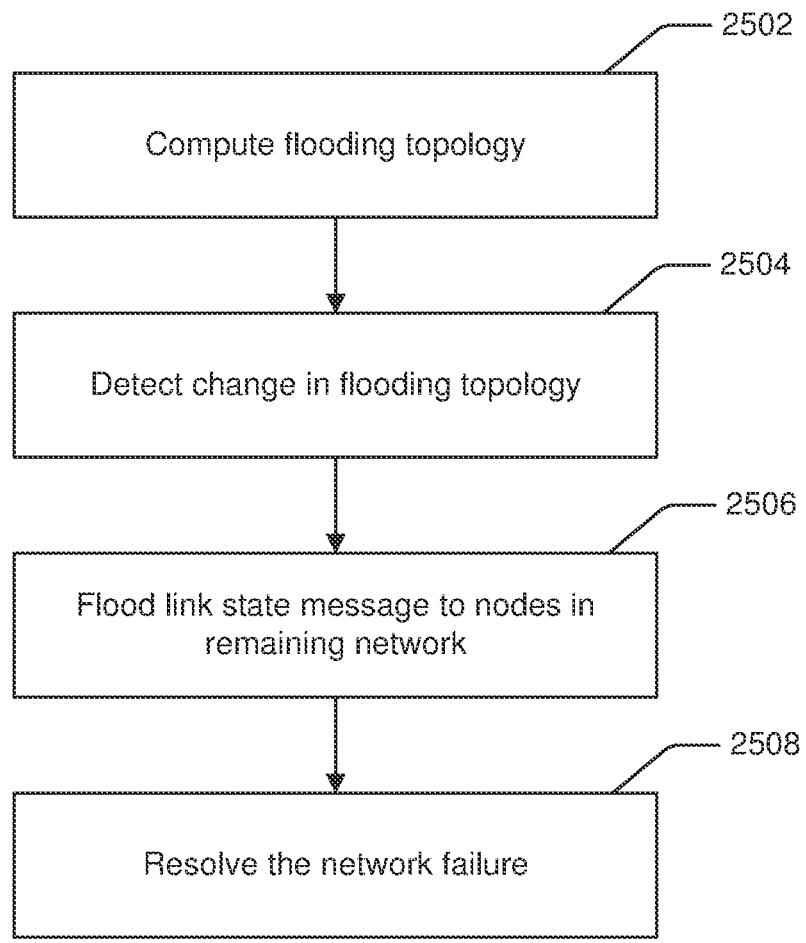
FIG. 25 illustrates an example flow diagram recovering from a failure in a network.

FIG. 25 illustrates an example flow diagram for computing a path in a network. In embodiments, the flow diagram may be computer-implemented methods performed, at least partly, by hardware and/or software components illustrated in the various figures and as described herein. In one embodiment, the disclosed process may be performed by the nodes disclosed in FIGS. 1, 2A-2D, etc. In one embodiment, software components executed by one or more processors, such processor 2620 or 2702, performs at least a portion of the process.

The process begins at step 2502, where a node in the network, such as a leader node or a local node, computes a flooding topology, represented by links between nodes in the network, and alternative connections for the links and the nodes on the flooding topology. At step 2504, a change is detected in the flooding topology, the change indicating the failure in the network and resulting in a split of the flooding topology. A link state message in then flooded to each of the nodes in a remaining part of the flooding topology and to the alternative connections such that the link state message identifying the failure in the network, at step 2506. At step 2508, the failure in the network is resolved by connecting the split flooding topology using the remaining part of the flooding topology and the alternative connections as identified in the link state message.

Figure 26:
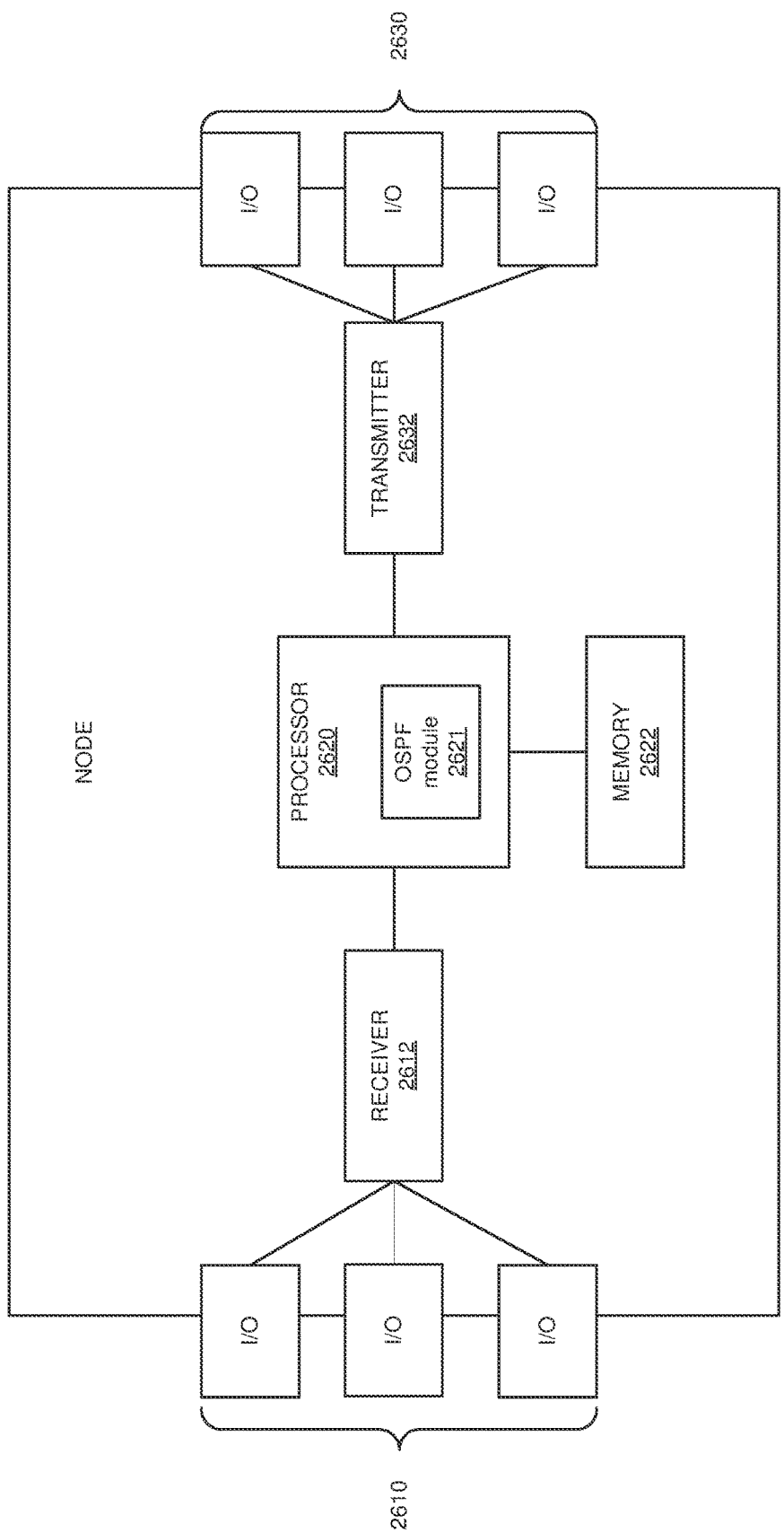
FIG. 26 illustrates an embodiment of a router.

FIG. 26 illustrates an embodiment of a router. The node (e.g., a router) 2600 may be any node or router as described, for example, in FIGS. 1 and 2. The node 2600 may comprise a plurality of input/output ports 2610/2630 and/or receivers (Rx) 2612 and transmitters (Tx) 2632 for receiving and transmitting data from other nodes, a processor 2620 to process data and determine which node to send the data to and a memory. The node 2600 may also generate and distribute LSAs to describe and flood the various topologies and/or area of a network. Although illustrated as a single processor, the processor 2620 is not so limited and may comprise multiple processors. The processor 2620 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. Moreover, the processor 2620 may be implemented using hardware, software, or both. The processor 2620 includes an OSPF module 2621, which implements the disclosed embodiments. The inclusion of the OSPF module 2621 therefore provides a substantial improvement to the functionality of the network device 2600 and effects a transformation of the node 2600 to a different state. Alternatively, the memory 2622 stores the OSPF module 2621 as instructions, and the processor 2620 executes those instructions.

The memory 2622 may be configured to store reference structures, such as single structure and network topologies. Although illustrated as a single memory, memory 2622 may be implemented as a combination of read only memory (ROM), random access memory (RAM), or secondary storage (e.g., one or more disk drives or tape drives used for non-volatile storage of data).

The schemes described above may be implemented on any general-purpose network component, such as a computer or network component with sufficient processing power, memory resources, and network throughput capability to handle the necessary workload placed upon it.

Figure 27:
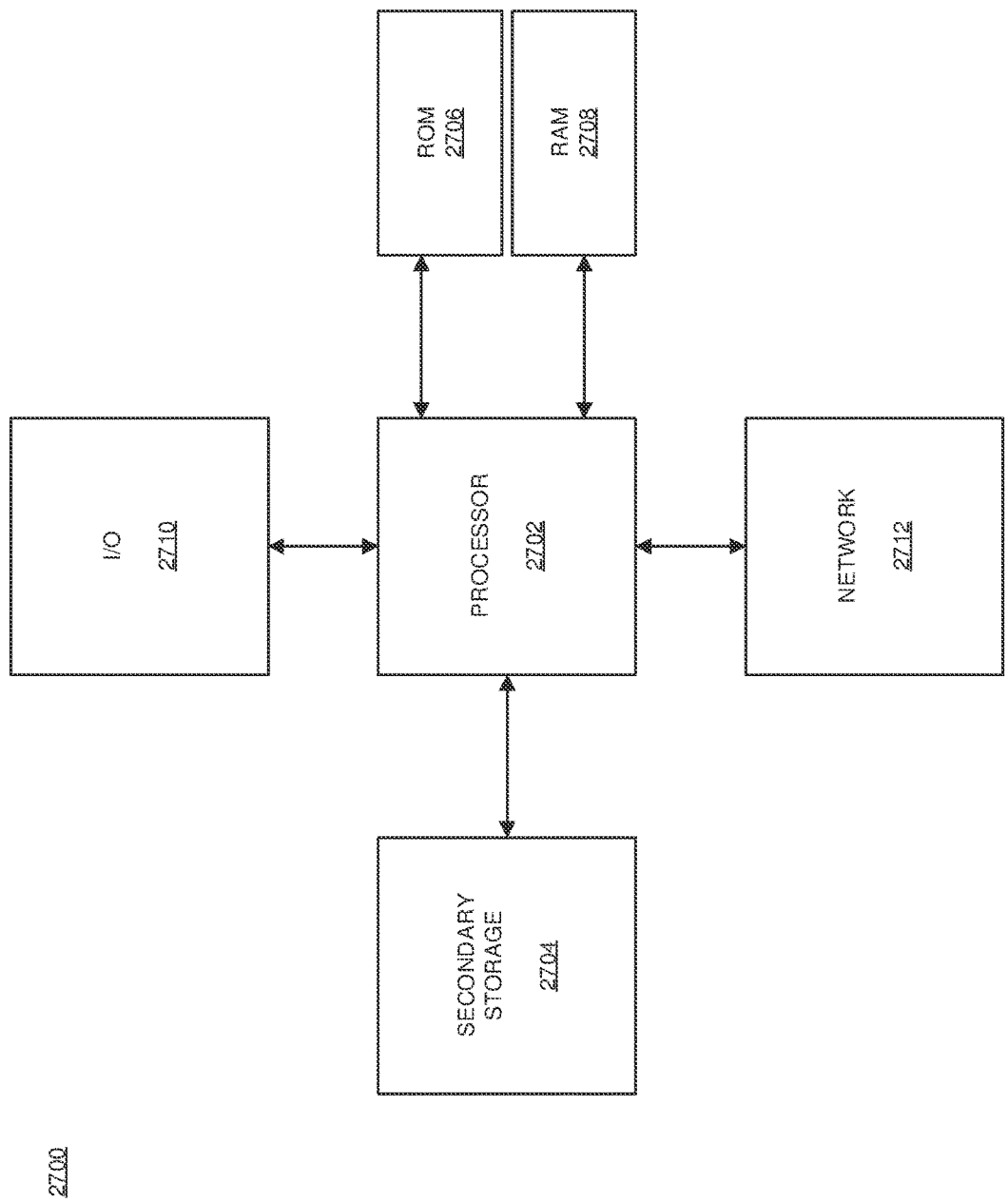
FIG. 27 illustrates a schematic diagram of a general-purpose network component or computer system.

FIG. 27 illustrates a schematic diagram of a general-purpose network component or computer system. The general-purpose network component or computer system 2700 includes a processor 2702 (which may be referred to as a central processor unit or CPU) that is in communication with memory devices including secondary storage 2704, and memory, such as ROM 2706 and RAM 2708, input/output (I/O) devices 2710, and a network 2712, such as the Internet or any other well-known type of network, that may include network connectively devices, such as a network interface. Although illustrated as a single processor, the processor 2702 is not so limited and may comprise multiple processors. The processor 2702 may be implemented as one or more CPU chips, cores (e.g., a multi-core processor), FPGAs, ASICs, and/or DSPs, and/or may be part of one or more ASICs. The processor 2702 may be configured to implement any of the schemes described herein. The processor 2702 may be implemented using hardware, software, or both.

The secondary storage 2704 is typically comprised of one or more disk drives or tape drives and is used for non-volatile storage of data and as an over-flow data storage device if the RAM 2708 is not large enough to hold all working data. The secondary storage 2704 may be used to store programs that are loaded into the RAM 2708 when such programs are selected for execution. The ROM 2706 is used to store instructions and perhaps data that are read during program execution. The ROM 2706 is a non-volatile memory device that typically has a small memory capacity relative to the larger memory capacity of the secondary storage 2704. The RAM 2708 is used to store volatile data and perhaps to store instructions. Access to both the ROM 2706 and the RAM 2708 is typically faster than to the secondary storage 2704. At least one of the secondary storage 2704 or RAM 2708 may be configured to store routing tables, forwarding tables, or other tables or information disclosed herein.

It is understood that by programming and/or loading executable instructions onto the node 2600, at least one of the processor 2720 or the memory 2722 are changed, transforming the node 2600 in part into a particular machine or apparatus, e.g., a router, having the novel functionality taught by the present disclosure. Similarly, it is understood that by programming and/or loading executable instructions onto the node 2600, at least one of the processor 2702, the ROM 2706, and the RAM 2708 are changed, transforming the node 2600 in part into a particular machine or apparatus, e.g., a router, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network with one or more nodes, comprising:
a first node including a processor, a receiver and a transmitter configured to:
compute a flooding topology, represented by links between the one or more nodes in the network, and alternative connections for the links and the one or more nodes on the flooding topology;
detect a change in the flooding topology, the change indicating a failure in the network and resulting in a split of the flooding topology;
compute a new flooding topology based on the alternative connections, the new flooding topology including all of the one or more nodes; and minimizing links between the one or more nodes;
flood a link state message to each of the one or more nodes in the new flooding topology, the link state message identifying the failure in the network; and
resolving the failure in the network by connecting the split flooding topology using the new flooding topology and the alternative connections as identified in the link state message.

2. A computer-implemented method for recovering from a failure in a network, comprising:
computing a flooding topology, represented by links between one or more nodes in the network, and alternative connections for the links and the one or more nodes on the flooding topology;
detecting a change in the flooding topology, the change indicating the failure in the network and resulting in a split of the flooding topology;
computing a new flooding topology based on the alternative connections, the new flooding topology including all of the one or more nodes; and minimizing links between the one or more nodes;
flooding a link state message to each of the one or more nodes in the new flooding topology, the link state message identifying the failure in the network; and
resolving the failure in the network by connecting the split flooding topology using the new flooding topology and the alternative connections as identified in the link state message.

3. The computer-implemented method of claim 2, further comprising:
identifying one or more critical nodes in the flooding topology, where failure of the one or more critical nodes results in the flooding topology being split; and
identifying one or more critical links in the flooding topology between the critical node and the one or more nodes in the network, where failure of the one or more critical links results in the flooding topology being split.

4. The computer-implemented method of claim 3, wherein
the alternative connection is between two end nodes of the link on the flooding topology or a path crossing one of the nodes on the flooding topology, and
further comprising distributing the link state message, including the alternative connection, to the two end nodes to connect the split flooding topology when the one or more critical links fail; and
distributing the link state message, including the path crossing the one of the nodes, to connect the split flooding topology when the critical node fails.

5. The computer-implemented method of claim 4, further comprising:
and
sending a status of the link state to an adjacent node over a link attached to the node when the link is not on the flooding topology, the link is on the new flooding topology, and a failure occurs on the network after the flooding topology has been computed.

6. The computer-implemented method of claim 5, wherein the status of the link state is one of the link state that the node originates or receives during a period of time in which the flooding topology is split, and the link state with the change that the node originates or receives during the period of time in which the flooding topology is split.

7. The computer-implemented method of claim 6, wherein the period of time is one of a sum of a maximum amount of time in which link states containing changes take to flood the flooding topology, the maximum amount of time in which to compute a new flooding topology, and the maximum amount of time in which the new flooding topology is distributed to the one or more nodes in a network area.

8. The computer-implemented method of claim 5, wherein each of the one or more nodes include a link state database, the method further comprising
synchronizing the link state database in any one of the nodes in the network with any other adjacent node over a link on the new flooding topology.

9. The computer-implemented method of claim 2, further comprising
originating a link state message with a first flag set to indicate a local link failure when one of the nodes detect a local link failure; and
sending the link state message to each of the links attached to the node in the flooding topology, except to the failed local link.

10. The computer-implemented method of claim 2, further comprising
receiving a link state message with a link state, the link state identifiable by a first flag set to indicate a local link failure;
determining the failed local link by comparing a link state in a link state database of the node to the link state received in the link state message; and
sending the received link state in the link state message to links attached to the node, except to the failed local link, when the failed local link is on the flooding topology and a number of hops from the node to the node originating the link state message is less than a specified number.

11. The computer-implemented method of claim 2, further comprising
originating a link state message with a first flag set to indicate a local link failure when one of the nodes detect a local link failure; and
sending the link state message to each of the nodes links on the flooding topology, except to the failed local link, including local links on the alternative connections for an adjacent node.

12. The computer-implemented method of claim 2, further comprising receiving a link state message with a link state, the link state identifiable by a first flag set to indicate a local link failure;

determining the failed local link by comparing a link state in a link state database of the node to the link state received in the link state message; and sending the link state message to each of the nodes links on the flooding topology, except to the failed local link, including local links on the alternative connections for an adjacent node.

13. The computer-implemented method of claim 2, further comprising receiving a link state message with a link state, the link state identifiable by a first flag set to indicate a local link failure;

determining the failed local link by receiving the link state message with the first flag set to indicate a local link failure from two end nodes of the local link; and sending the link state message to each of the nodes links on the flooding topology, except to the failed local link or the link from which the link state message was received.

14. The computer-implemented method of claim 2, further comprising originating a link state message with a first flag set to indicate a local link failure and a second flag set to indicate a local node failure when failure of an adjacent node over a local link is detected; and sending the link state message to each of the links attached to the node on the flooding topology, except to the failed local link.

15. The computer-implemented method of claim 2, further comprising receiving a link state message with a first flag set to indicate a local link failure and a second flag set to indicate no local node failure when failure of an adjacent node over a local link is detected;

determining the failed local link by receiving the link state message with the first flag set to indicate a local link failure; and sending the link state message to each of the nodes links on the flooding topology, except to the failed local link or the link from which the link state message was received.

16. The computer-implemented method of claim 2, further comprising receiving a link state message with a first flag set to indicate a local link failure and a second flag set to indicate a local node failure when failure of an adjacent node over a local link is detected;

determining the failed local link by receiving the link state message with the first flag set to indicate a local link failure and a second flag set to indicate a local node failure; and sending the link state message to each of the nodes links on the flooding topology, except to the failed local link or the link from which the link state message was received.

17. The computer-implemented method of claim 2, further comprising detecting two or more adjacent node failures;

originating a link state message with a first flag set to indicate a local link failure when the node detects a local link failure; and sending the link state message to each of the nodes links on the flooding topology, except to the failed local link.

18. The computer-implemented method of claim 2, further comprising detecting two or more adjacent node failures;

receiving a link state message with a link state, the link state identifiable by a first flag set to indicate a local link failure;

determining the failed local link and the two or more adjacent nodes by comparing the link state in a link state database with the link state received in the link state message; and sending the link state message to each of the nodes links on the flooding topology, except to the failed local link or the link from which the link state message was received.

19. A device for path computation and setup in a network, comprising:

a non-transitory memory storage comprising instructions; and one or more processors in communication with the memory, wherein the one or more processors execute the computer instructions stored in memory to cause the device to:

compute a flooding topology, represented by links between one or more nodes in the network, and alternative connections for the links and the one or more nodes on the flooding topology;

detect a change in the flooding topology, the change indicating a failure in the network and resulting in a split of the flooding topology;

computing a new flooding topology based on the alternative connections, the new flooding topology including all of the one or more nodes; and minimizing links between the one or more nodes;

flood a link state message to each of the one or more nodes in the new flooding topology, the link state message identifying the failure in the network; and resolve the failure in the network by connecting the split flooding topology using the new flooding topology and the alternative connections as identified in the link state message.

20. The device of claim 19, wherein the one or more processors further execute the instructions to:

identify one or more critical nodes in the flooding topology, where failure of the one or more critical nodes results in the flooding topology being split; and identify one or more critical links in the flooding topology between the critical node and the one or more nodes in the network, where failure of the one or more critical links results in the flooding topology being split.

21. The device of claim 20, wherein the alternative connection is between two end nodes of the link on the flooding topology or a path crossing one of the nodes on the flooding topology, and wherein the one or more processors further execute the instructions to:

distribute the link state message, including the alternative connection, to the two end nodes to connect the split flooding topology when the one or more critical links fail; and distribute the link state message, including the path crossing the one of the nodes, to connect the split flooding topology when the critical node fails.

22. The device of claim 21, wherein the one or more processors further execute the instructions to:

and send a status of the link state to an adjacent node over a link attached to the node when the link is not on the flooding topology, the link is on the new flooding topology, and a failure occurs on the network after the flooding topology has been computed.

23. The device of claim 22, wherein the status of the link state is one of the link state that the node originates or receives during a period of time in which the flooding topology is split, and the link state with the change that the node originates or receives during the period of time in which the flooding topology is split.

24. The device of claim 23, wherein the period of time is one of a sum of a maximum amount of time in which link states containing changes take to flood the flooding topology, the maximum amount of time in which to compute a new flooding topology, and the maximum amount of time in which the new flooding topology is distributed to the one or more nodes in a network area.

25. The device of claim 22, wherein each of the one or more nodes include a link state database, wherein the link state database in any one of the nodes in the network is synchronized with any other adjacent node over a link on the new flooding topology.

26. A non-transitory computer-readable medium storing computer instructions for recovering from a failure in a network, that when executed by one or more processors, cause the one or more processors to perform the steps of:

computing a flooding topology, represented by links between one or more nodes in the network, and alternative connections for the links and the one or more nodes on the flooding topology;

detecting a change in the flooding topology, the change indicating the failure in the network and resulting in a split of the flooding topology;

computing a new flooding topology based on the alternative connections, the new flooding topology including all of the one or more nodes; and minimizing links between the one or more nodes;

flooding a link state message to each of the one or more nodes in the new flooding topology, the link state message identifying the failure in the network; and resolving the failure in the network by connecting the split flooding topology using the new flooding topology and the alternative connections as identified in the link state message.

* * * * *